US012369195B2

(12) United States Patent
Noh et al.

(10) Patent No.: US 12,369,195 B2
(45) Date of Patent: Jul. 22, 2025

(54) METHOD AND DEVICE FOR TRANSMITTING SIGNALS IN WIRELESS COMMUNICATION SYSTEM

(71) Applicant: WILUS INSTITUTE OF STANDARDS AND TECHNOLOGY INC., Gyeonggi-do (KR)

(72) Inventors: Minseok Noh, Gyeonggi-do (KR); Geunyoung Seok, Gyeonggi-do (KR); Juhyung Son, Gyeonggi-do (KR); Jinsam Kwak, Gyeonggi-do (KR)

(73) Assignee: WILUS INSTITUTE OF STANDARDS AND TECHNOLOGY INC., Gyeonggi-do (KR)

( * ) Notice: Subject to any disclaimer, the term of this patent is extended or adjusted under 35 U.S.C. 154(b) by 0 days.

(21) Appl. No.: 18/803,422

(22) Filed: Aug. 13, 2024

(65) Prior Publication Data
US 2024/0407004 A1 Dec. 5, 2024

Related U.S. Application Data

(63) Continuation of application No. PCT/KR2023/002135, filed on Feb. 14, 2023.

(30) Foreign Application Priority Data

Feb. 14, 2022 (KR) .................. 10-2022-0019204

(51) Int. Cl.
*H04W 74/0816* (2024.01)
*H04W 74/08* (2009.01)
*H04W 74/0833* (2024.01)

(52) U.S. Cl.
CPC ..... *H04W 74/0816* (2013.01); *H04W 74/085* (2013.01); *H04W 74/0866* (2013.01)

(58) Field of Classification Search
None
See application file for complete search history.

(56) References Cited

U.S. PATENT DOCUMENTS 11,497,056 B2 11/2022 Goyal et al.
12,075,475 B2 * 8/2024 Yang ................. H04L 27/26025
(Continued)

FOREIGN PATENT DOCUMENTS

KR 10-2022-0015937 2/2022
WO WO2023039614 * 1/2022
(Continued)

OTHER PUBLICATIONS

International Search Report for PCT/KR2023/002135 mailed on May 26, 2023 and its English translation from WIPO (now published as WO2023/153911).
(Continued)

*Primary Examiner* — Mohammad S Adhami
(74) *Attorney, Agent, or Firm* — WOMBLE BOND DICKINSON (US) LLP

(57) ABSTRACT

The present invention relates to a wireless communication system and, more specifically, to a method and a wireless device therefor, the method comprising the steps of: successfully accessing channels in one or more sensing beams before a channel occupancy (CO) starts, each sensing beam covering one or more transmission beams in the CO; and, after transmission using a first transmission beam in the CO, performing a channel access procedure on a sensing beam corresponding to a second transmission beam in order to perform transmission using the second transmission beam in the CO.

12 Claims, 17 Drawing Sheets

(56) References Cited

U.S. PATENT DOCUMENTS

| | | |
|---|---|---|
| 2021/0360698 A1 | 11/2021 | Xu et al. |
| 2022/0022246 A1* | 1/2022 | Luo .................. H04B 7/0695 |
| 2022/0046702 A1 | 2/2022 | Hu et al. |
| 2023/0232457 A1* | 7/2023 | Hu ..................... H04W 72/40 370/329 |
| 2023/0262764 A1* | 8/2023 | Myung ............ H04W 74/0866 370/329 |
| 2024/0155635 A1* | 5/2024 | Kim .................. H04L 1/0003 |
| 2024/0324006 A1* | 9/2024 | Shibaike ............ H04W 16/14 |

FOREIGN PATENT DOCUMENTS

| | | |
|---|---|---|
| WO | 2022/030873 | 2/2022 |
| WO | 2022/031973 | 2/2022 |
| WO | 2023/153911 | 8/2023 |

OTHER PUBLICATIONS

Written Opinion of the International Searching Authority for PCT/KR2023/002135 mailed on May 26, 2023 and its English translation by Google Translate (now published as WO2023/153911).

Moderator (Qualcomm Incorporated): "Contribution summary of channel access mechanism for 52.6GHz-71GHz band, ver02", 3GPP TSG RAN WG1 Meeting #106-e, R1-2108367, Aug. 26m 2021, pp. 1-108.

3GPP TS 37.213 V17.1.0 (Mar. 2022): "3rd Generation Partnership Project; Technical Specification Group Radio Access Network; Physical layer procedures for shared spectrum channel access (Release 17)", pp. 1-38.

3GPP TS 37.213 V17.2.0 (Jun. 2022): "3rd Generation Partnership Project; Technical Specification Group Radio Access Network; Physical layer procedures for shared spectrum channel access (Release 17)", pp. 1-39.

Wilus Inc.: "Remaining issues on channel access for NR from 52.6GHz to 71GHz", 3GPP TSG RAN WG1 #107-e, R1-2112385, e-Meeting, Nov. 11-19, 2021, pp. 1-3.

Wilus Inc.: "Remaining issue on channel access for NR from 52.6GHz to 71GHz", 3GPP TSG RAN WG1 #107bis-e, R1-2200633, e-Meeting, Jan. 17-25, 2022, pp. 1-4.

Wilus Inc.: "Remaining issue on channel access for NR from 52.6GHz to 71GHz", 3GPP TSG RAN WG1 #108-e, R1-2202484, e-Meeting, Feb. 21-Mar. 3, 2022, pp. 1-3.

Wilus Inc.: "Remaining issue on channel access for NR from 52.6GHz to 71GHz", 3GPP TSG RAN WG1 #109-e, R1-2204546, e-Meeting, May 9-20, 2022, pp. 1-4.

Office Action (1st) dated Jun. 10, 2025 for Japanese Patent Application No. 2024-547735 and its English translation provided by Applicant's foreign counsel.

Samsung: "Maintenance on channel access mechanism for NR from 52.6 GHz to 71 GHz" , 3GPP TSG RAN WG1 #107b-e, R1-2200-197 , e-Meeting, Jan. 11, 2022, <https://www.3 gpp.org/ftp/tsg_ran/WG1_RL1/TSGR1_107be/Docs/R1-2200197.zip> , pp. 1-5.

Nokia, Nokia Shanghai Bell: "Channel access mechanism", 3GPP TSG RAN WG1 #106b-e, R1-2109447 , e-Meeting, Oct. 1, 2021, <https://www.3gpp.org/ftp/tsg_ran/WG1_RL1/TSGR1_106be/Docs/R1-2109447.zip>, pp. 1-23.

\* cited by examiner

[FIG. 1]
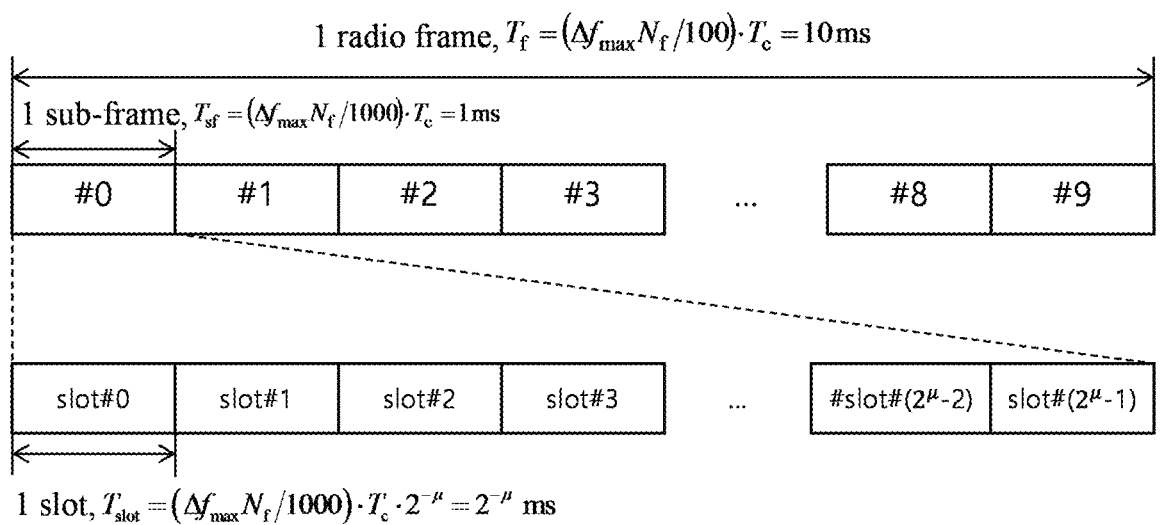

[FIG. 2]
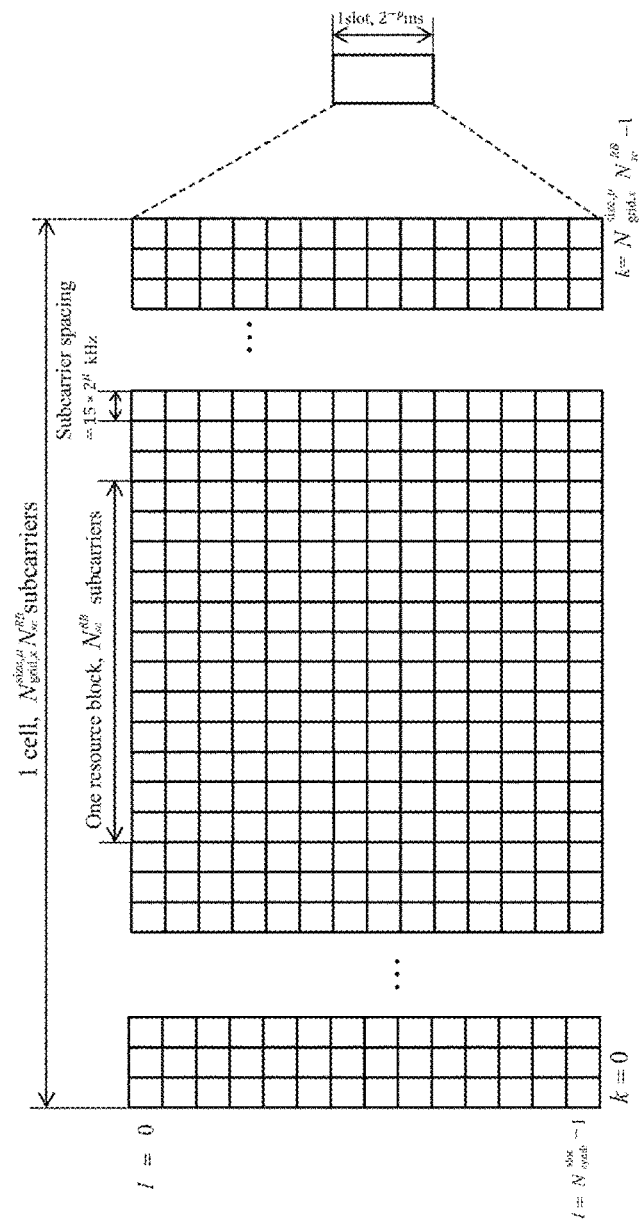

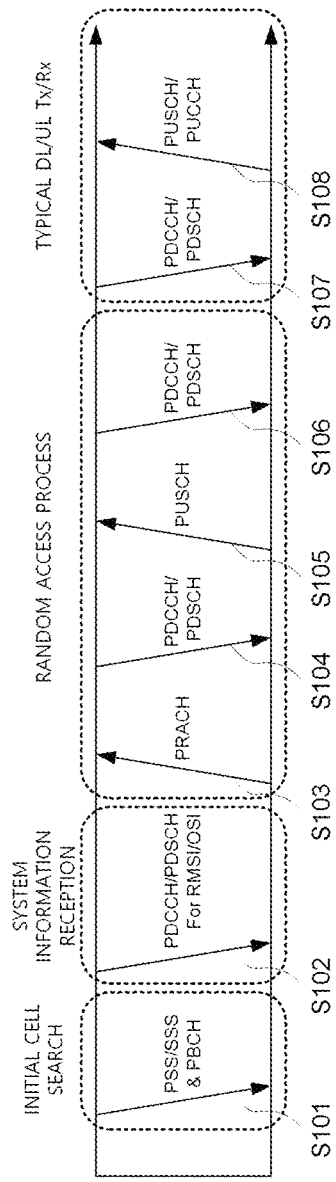
[FIG. 3]

[FIG. 4]
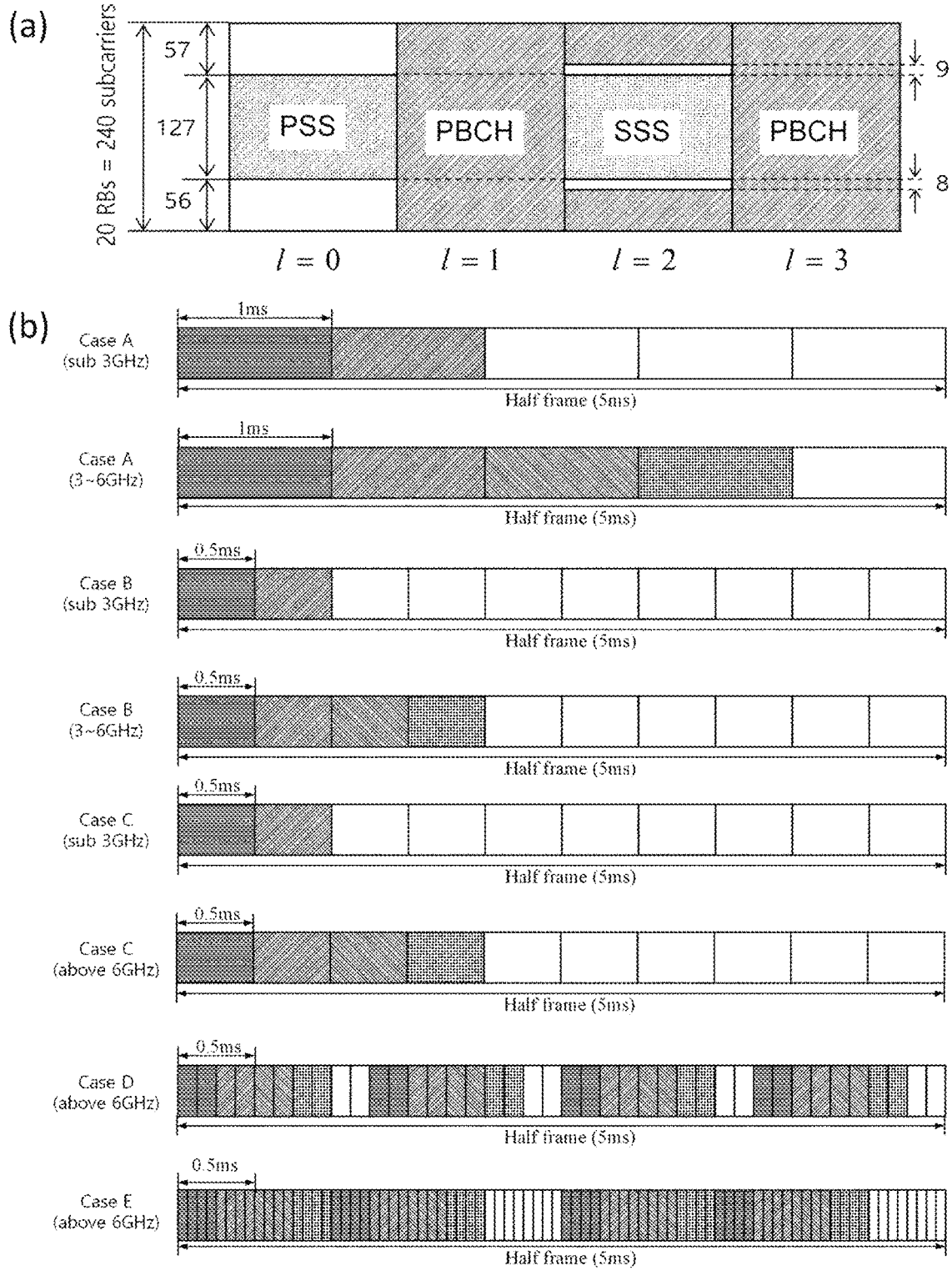

[FIG. 5]
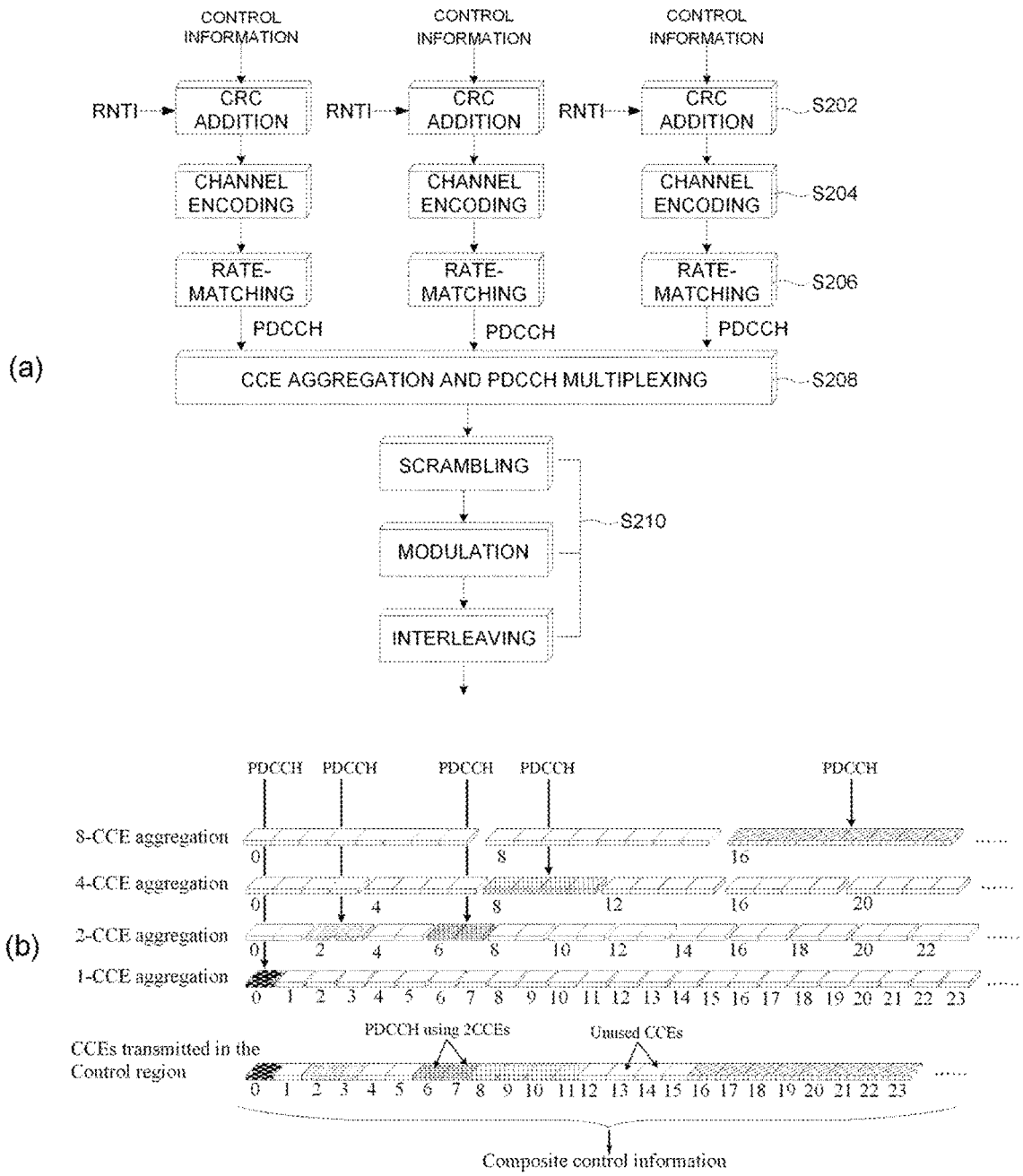

[FIG. 6]
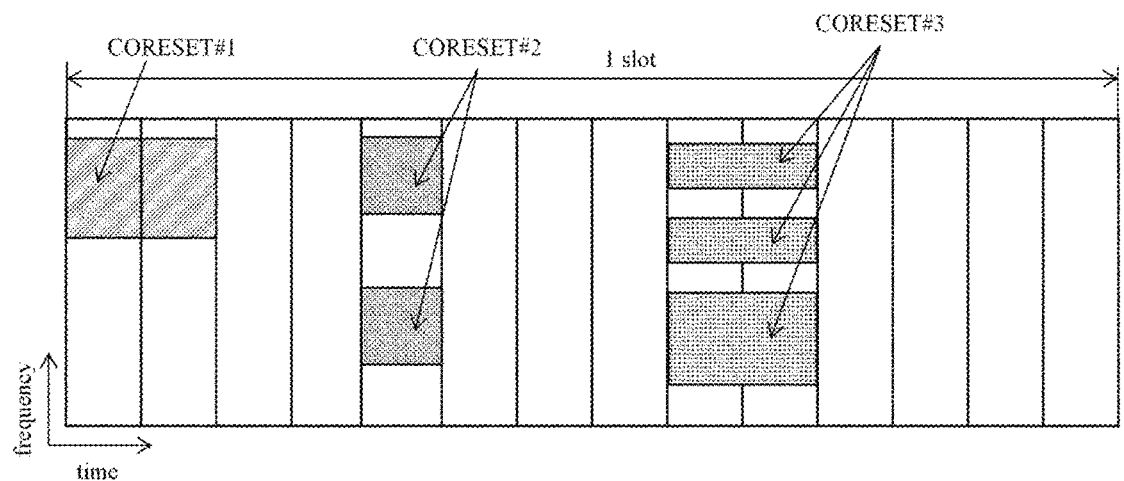

[FIG. 7]
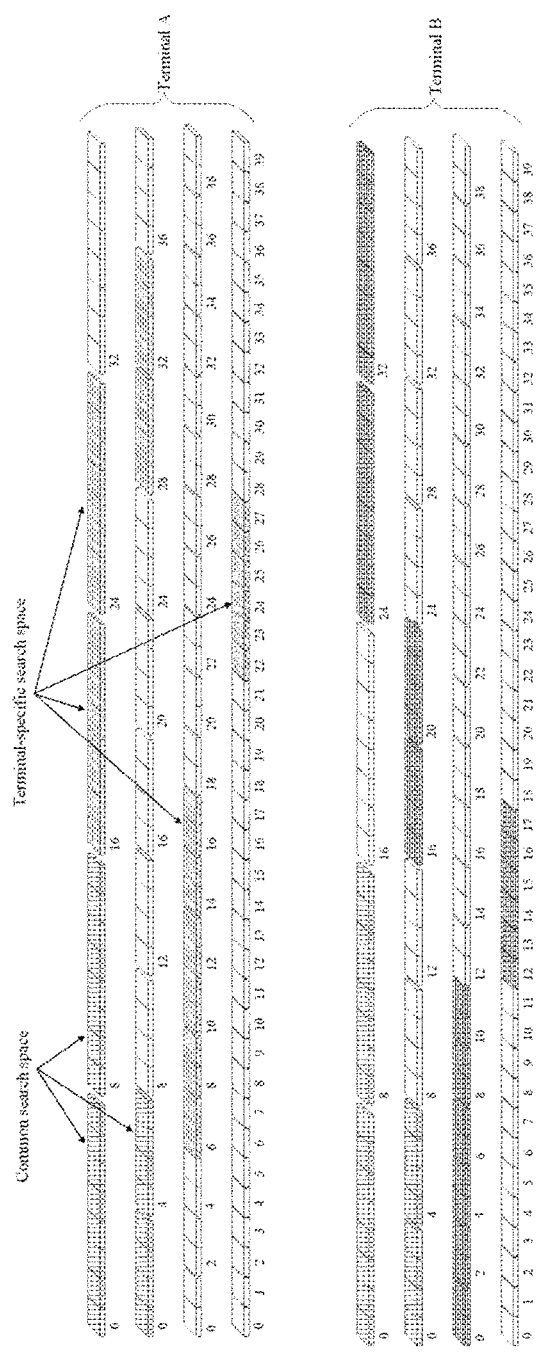

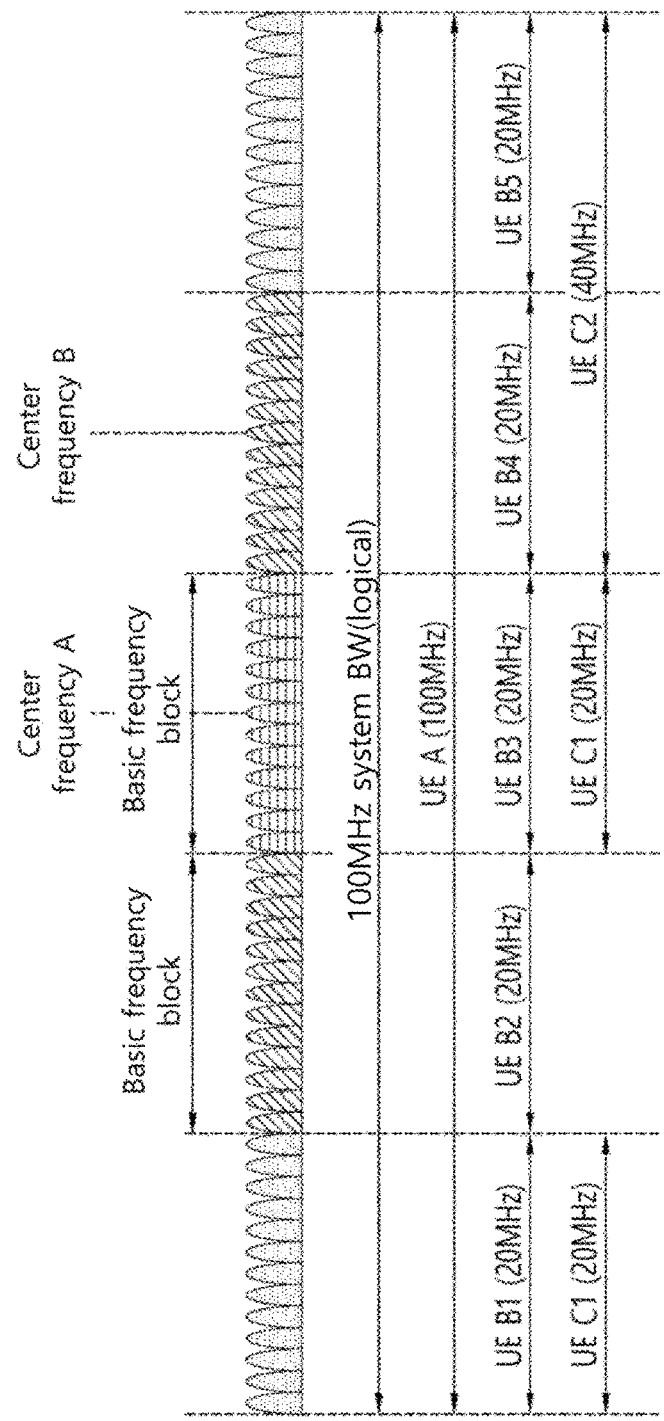
[FIG. 8]

[FIG. 9]
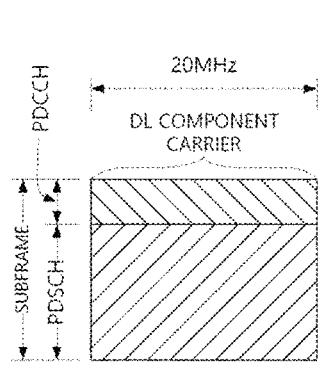
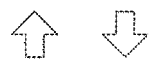
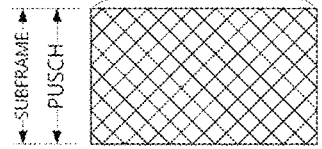
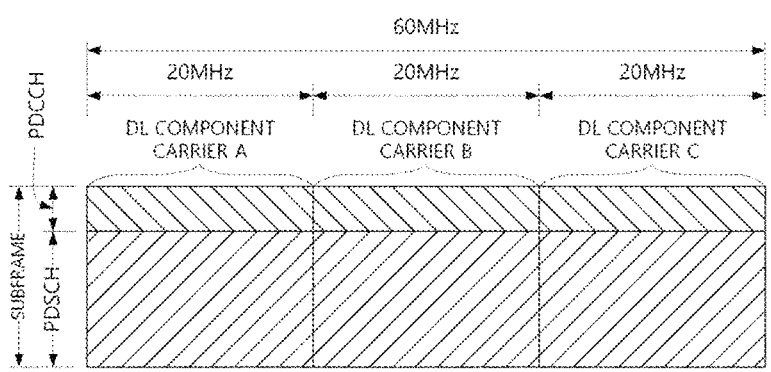
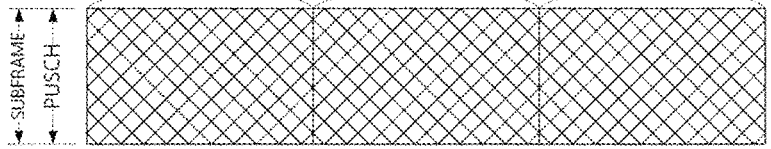
(a) Single CC
(b) Multiple CC

[FIG. 10]
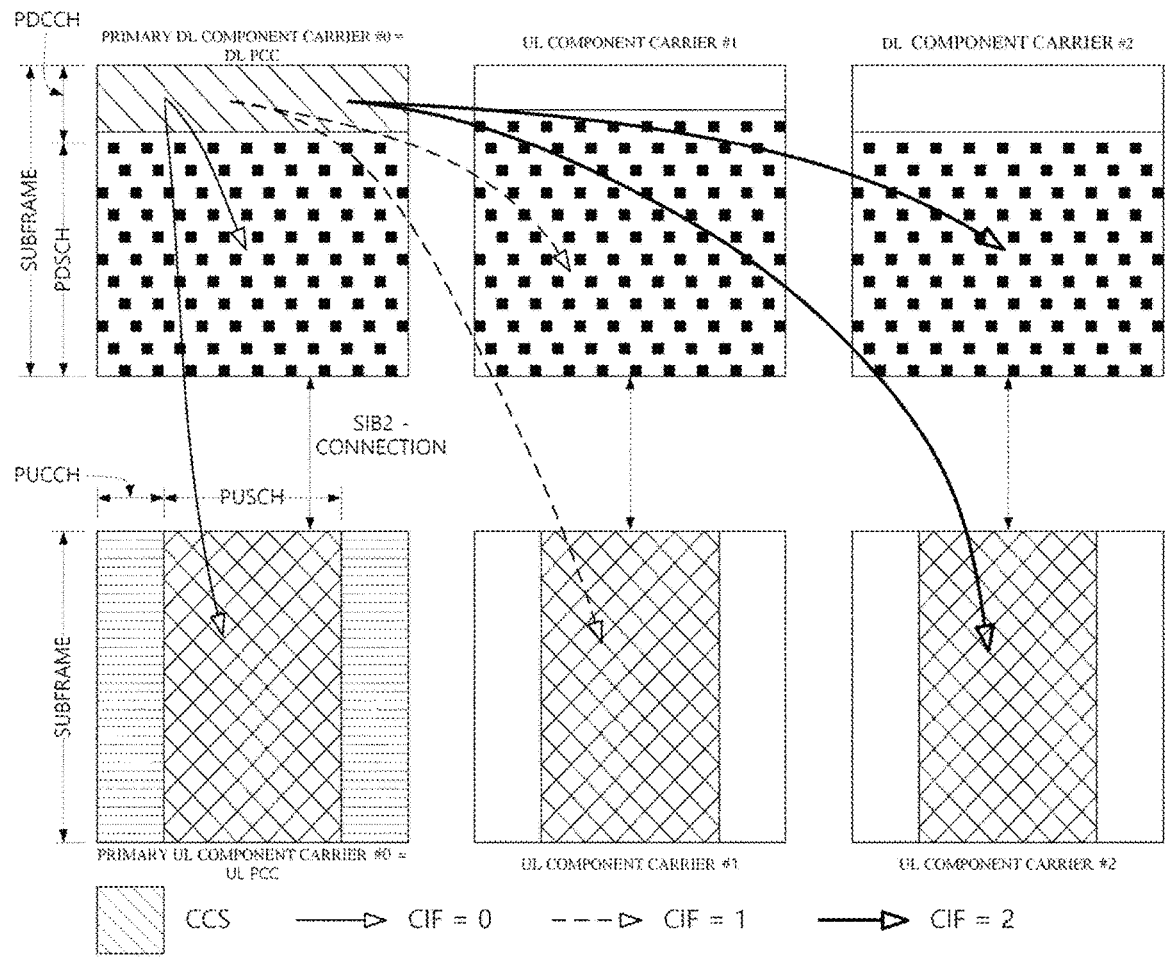
[FIG. 11]
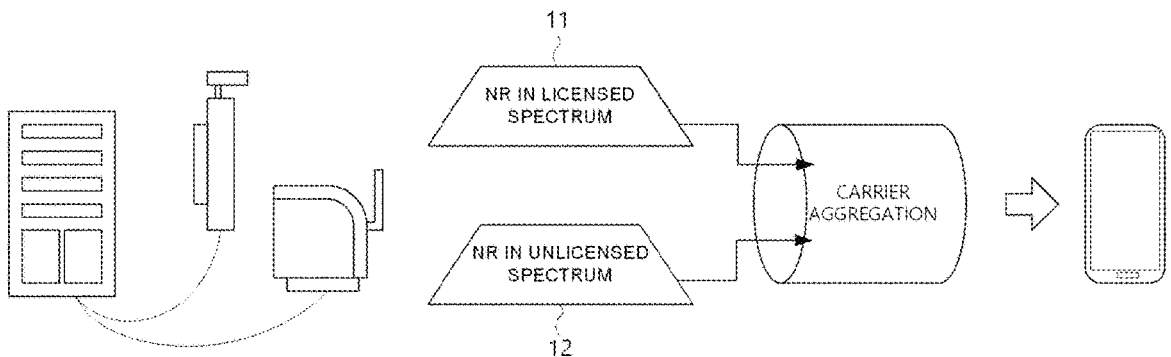

[FIG. 12]
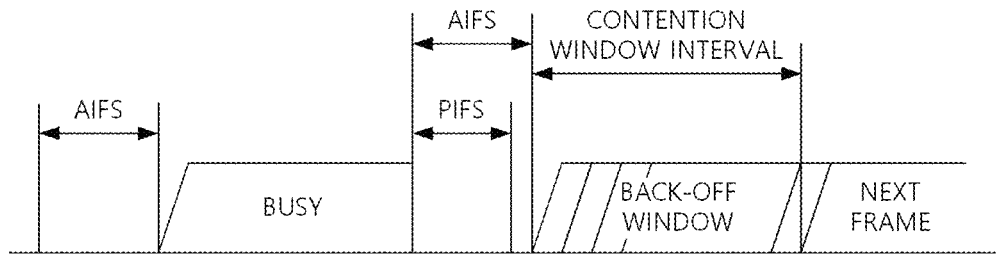
[FIG. 13]
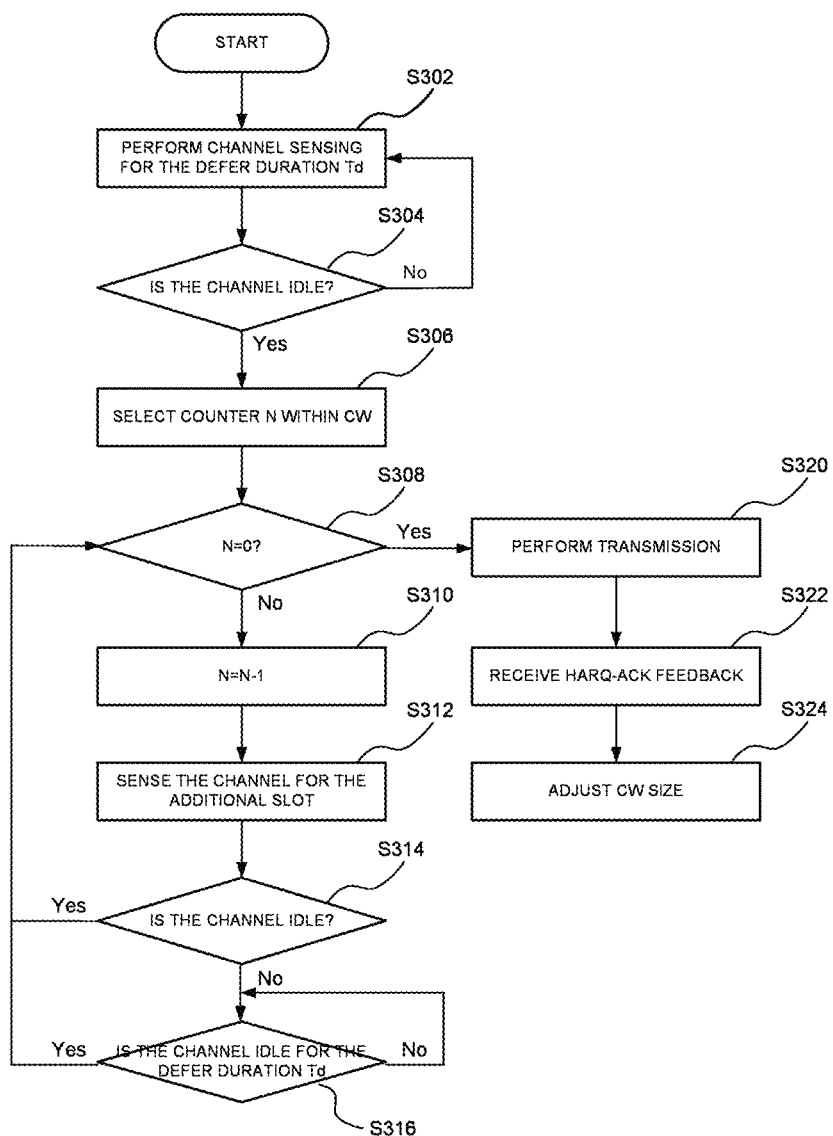

[FIG. 14]
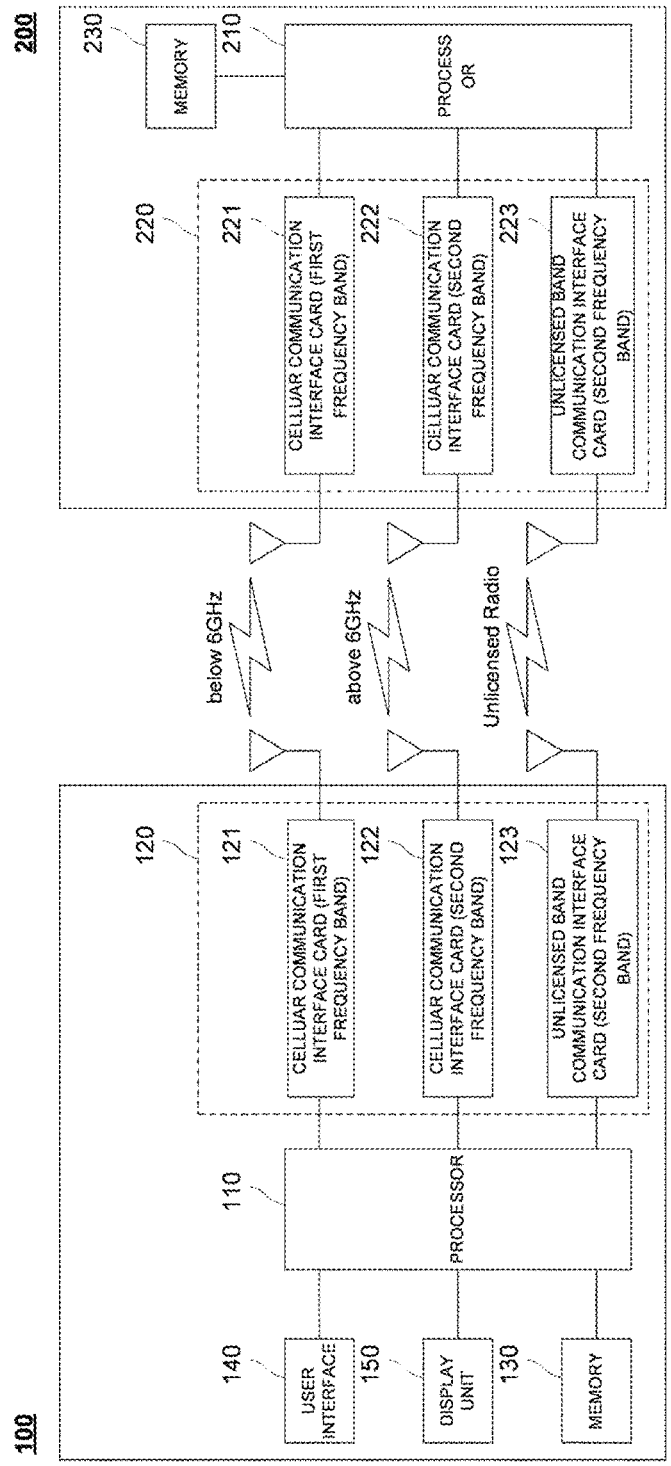

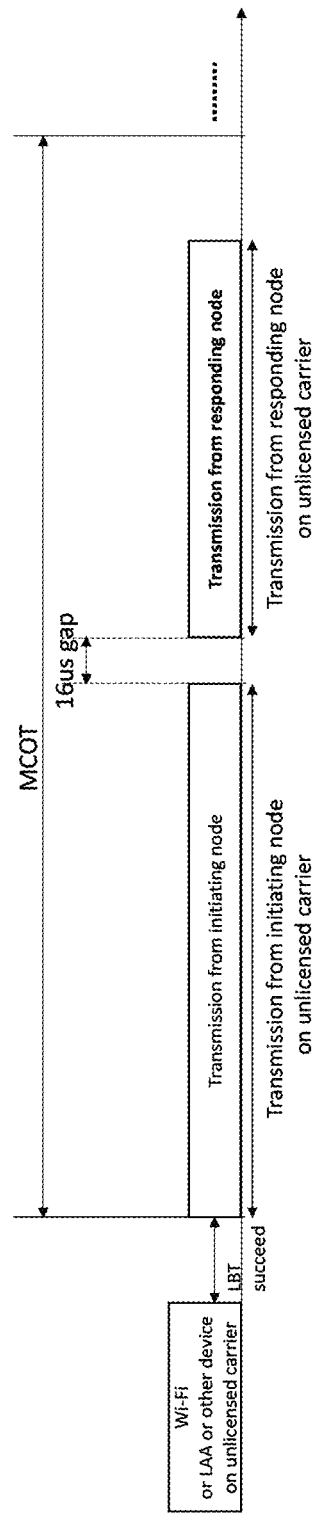
[FIG. 15]

[FIG. 16]
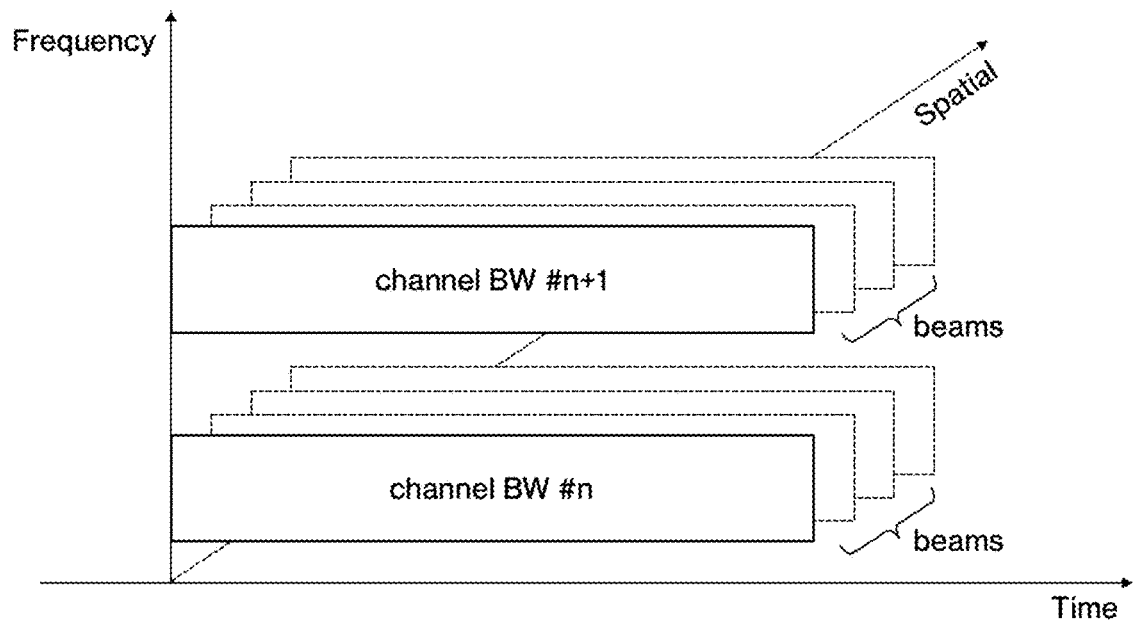
[FIG. 17]
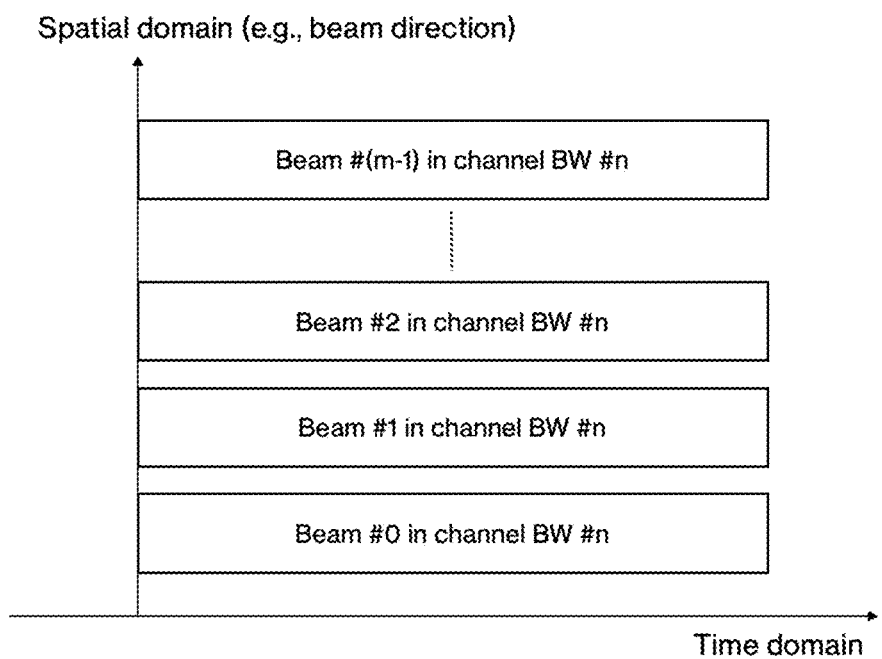

[FIG. 18]
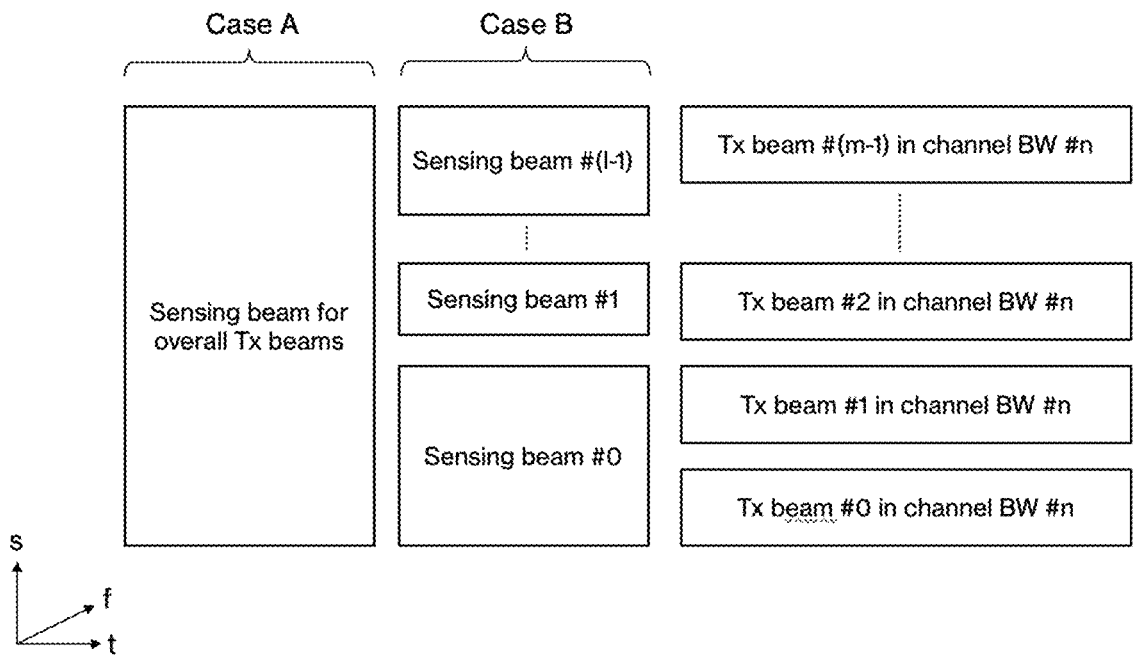
[FIG. 19]
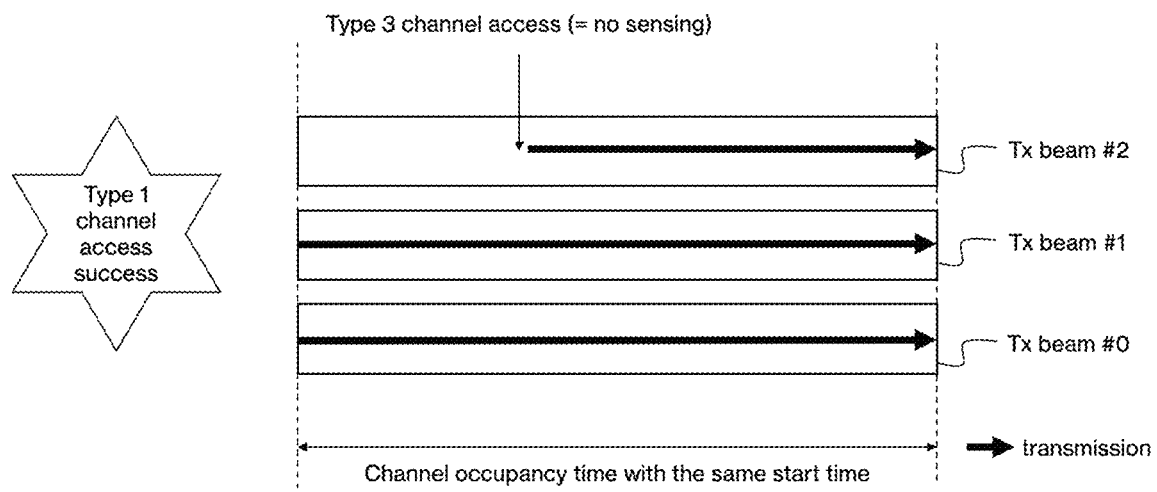

[FIG. 20]
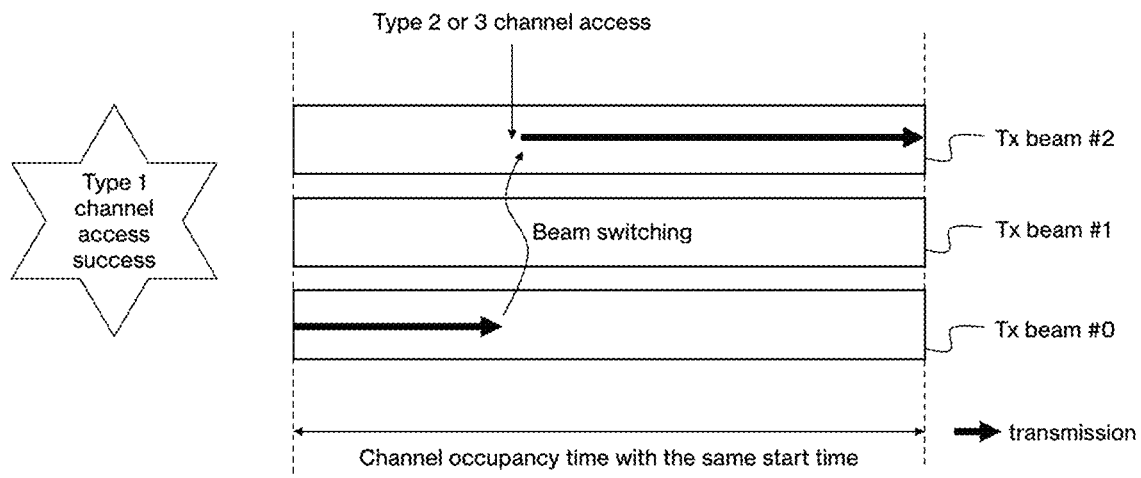
[FIG. 21]
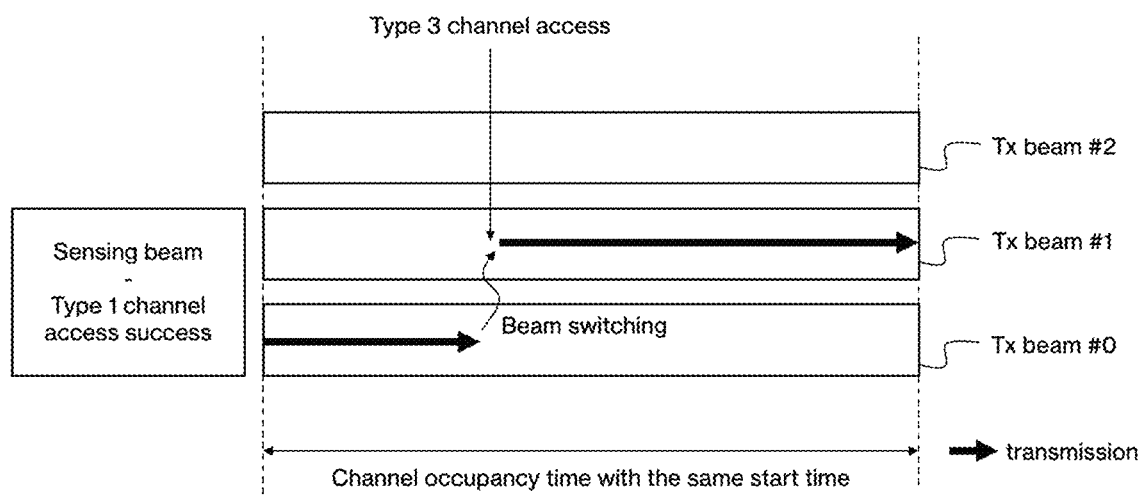

[FIG. 22]
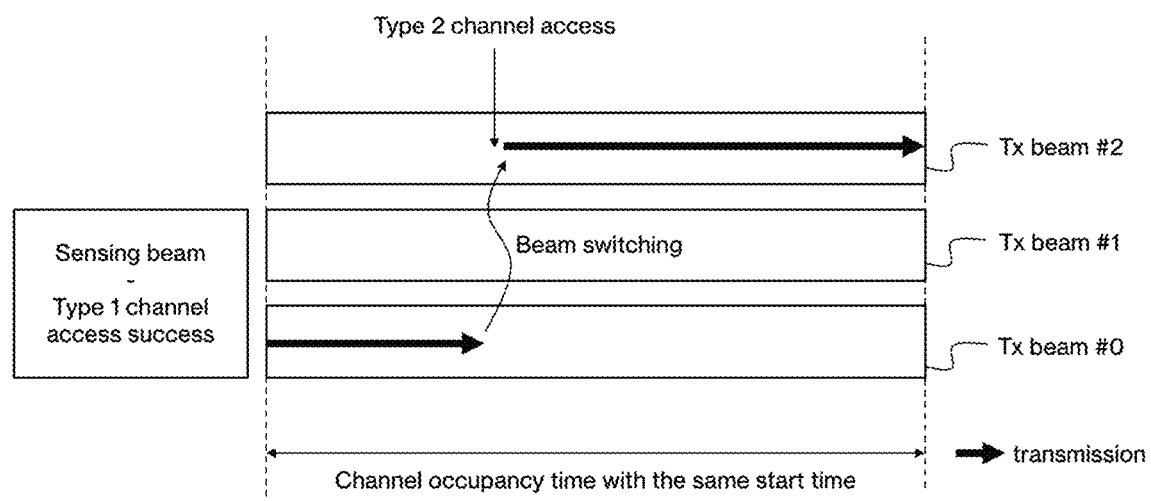

METHOD AND DEVICE FOR TRANSMITTING SIGNALS IN WIRELESS COMMUNICATION SYSTEM

TECHNICAL FIELD

The present invention relates to a wireless communication system. Specifically, the present invention relates to a channel access method and a device using the same in a wireless communication system.

BACKGROUND ART

After commercialization of 4th generation (4G) communication system, in order to meet the increasing demand for wireless data traffic, efforts are being made to develop new 5th generation (5G) communication systems. The 5G communication system is called as a beyond 4G network communication system, a post LTE system, or a new radio (NR) system. In order to achieve a high data transfer rate, 5G communication systems include systems operated using the millimeter wave (mmWave) band of 6 GHz or more, and include a communication system operated using a frequency band of 6 GHz or less in terms of ensuring coverage so that implementations in base stations and terminals are under consideration.

A 3rd generation partnership project (3GPP) NR system enhances spectral efficiency of a network and enables a communication provider to provide more data and voice services over a given bandwidth. Accordingly, the 3GPP NR system is designed to meet the demands for high-speed data and media transmission in addition to supports for large volumes of voice. The advantages of the NR system are to have a higher throughput and a lower latency in an identical platform, support for frequency division duplex (FDD) and time division duplex (TDD), and a low operation cost with an enhanced end-user environment and a simple architecture.

For more efficient data processing, dynamic TDD of the NR system may use a method for varying the number of orthogonal frequency division multiplexing (OFDM) symbols that may be used in an uplink and downlink according to data traffic directions of cell users. For example, when the downlink traffic of the cell is larger than the uplink traffic, the base station may allocate a plurality of downlink OFDM symbols to a slot (or subframe). Information about the slot configuration should be transmitted to the terminals.

In order to alleviate the path loss of radio waves and increase the transmission distance of radio waves in the mmWave band, in 5G communication systems, beamforming, massive multiple input/output (massive MIMO), full dimensional MIMO (FD-MIMO), array antenna, analog beam-forming, hybrid beamforming that combines analog beamforming and digital beamforming, and large scale antenna technologies are discussed. In addition, for network improvement of the system, in the 5G communication system, technology developments related to evolved small cells, advanced small cells, cloud radio access network (cloud RAN), ultra-dense network, device to device communication (D2D), vehicle to everything communication (V2X), wireless backhaul, non-terrestrial network communication (NTN), moving network, cooperative communication, coordinated multi-points (COMP), interference cancellation, and the like are being made. In addition, in the 5G system, hybrid FSK and QAM modulation (FQAM) and sliding window superposition coding (SWSC), which are advanced coding modulation (ACM) schemes, and filter bank multi-carrier (FBMC), non-orthogonal multiple access (NOMA), and sparse code multiple access (SCMA), which are advanced connectivity technologies, are being developed.

Meanwhile, in a human-centric connection network where humans generate and consume information, the Internet has evolved into the Internet of Things (IoT) network, which exchanges information among distributed components such as objects. Internet of Everything (IoE) technology, which combines IoT technology with big data processing technology through connection with cloud servers, is also emerging. In order to implement IoT, technology elements such as sensing technology, wired/wireless communication and network infrastructure, service interface technology, and security technology are required, so that in recent years, technologies such as sensor network, machine to machine (M2M), and machine type communication (MTC) have been studied for connection between objects. In the IoT environment, an intelligent internet technology (IT) service that collects and analyzes data generated from connected objects to create new value in human life can be provided. Through the fusion and mixture of existing information technology (IT) and various industries, IoT can be applied to fields such as smart home, smart building, smart city, smart car or connected car, smart grid, healthcare, smart home appliance, and advanced medical service.

Accordingly, various attempts have been made to apply the 5G communication system to the IoT network. For example, technologies such as a sensor network, a machine to machine (M2M), and a machine type communication (MTC) are implemented by techniques such as beamforming, MIMO, and array antennas. The application of the cloud RAN as the big data processing technology described above is an example of the fusion of 5G technology and IoT technology. Generally, a mobile communication system has been developed to provide voice service while ensuring the user's activity.

However, the mobile communication system is gradually expanding not only the voice but also the data service, and now it has developed to the extent of providing high-speed data service. However, in a mobile communication system in which services are currently being provided, a more advanced mobile communication system is required due to a shortage phenomenon of resources and a high-speed service demand of users.

In recent years, with the explosion of mobile traffic due to the spread of smart devices, it is becoming difficult to cope with the increasing data usage for providing cellular communication services using only the existing licensed frequency spectrums or licensed frequency bands.

In such a situation, a method of using an unlicensed frequency spectrum or an unlicensed frequency band (e.g., 2.4 GHz band, 5 GHz band, 6 GHz band, 52.6 GHz or higher band, or the like) for providing cellular communication services is being discussed as a solution to the problem of lack of spectrum.

Unlike in licensed bands in which telecommunications carriers secure exclusive use rights through procedures such as auctions, in unlicensed bands, multiple communication devices may be used simultaneously without restrictions on the condition that only a certain level of adjacent band protection regulations are observed. For this reason, when an unlicensed band is used for cellular communication service, it is difficult to guarantee the communication quality to the level provided in the licensed band, and it is likely that interference with existing wireless communication devices (e.g., wireless LAN devices) using the unlicensed band occurs.

In order to use LTE and NR technologies in unlicensed bands, research on coexistence with existing devices for unlicensed bands and efficient sharing of wireless channels with other wireless communication devices is to be conducted in advance. That is, it is required to develop a robust coexistence mechanism (RCM) such that devices using LTE and NR technologies in the unlicensed band do not affect the existing devices for unlicensed bands.

DISCLOSURE OF INVENTION

Technical Problem

An aspect of the present disclosure is to provide a method for efficiently transmitting signals in a wireless communication system and a device using the same. More particularly, an aspect of the present disclosure is to provide a channel access method for efficiently performing transmission in a wireless communication system and a device using the same.

Solution to Problem

An aspect of the present disclosure provides a wireless device used in a wireless communication system, the wireless device including: a communication module; and a processor configured to control the communication module, wherein the processor is configured to succeed in channel access on one or more sensing beams before starting channel occupancy (CO), each sensing beam covering one or more transmission beams within the CO, and perform a channel access procedure for a sensing beam corresponding to a second transmission beam in order to perform a transmission using the second transmission beam within the CO after a transmission using a first transmission beam within the CO, the channel access procedure includes a first channel access procedure performed without channel sensing when the sensing beam corresponding to the second transmission beam is included in the one or more sensing beams, and the channel access procedure includes a second channel access procedure based on fixed-duration channel sensing when the sensing beam corresponding to the second transmission beam is not included in the one or more sensing beams.

Another aspect of the present disclosure provides a method used by a wireless device in a wireless communication system including: succeeding in channel access on one or more sensing beams before starting channel occupancy (CO), each sensing beam covering one or more transmission beams within the CO; and performing a channel access procedure for a sensing beam corresponding to a second transmission beam in order to perform a transmission using the second transmission beam within the CO after a transmission using a first transmission beam within the CO, wherein the channel access procedure includes a first channel access procedure performed without channel sensing when the sensing beam corresponding to the second transmission beam is included in the one or more sensing beams, and the channel access procedure includes a second channel access procedure based on fixed-duration channel sensing when the sensing beam corresponding to the second transmission beam is not included in the one or more sensing beams.

Preferably, the transmission using the first transmission beam and the transmission using the second transmission beam may be multiplexed by time division multiplexing (TDM) in a time domain within the CO.

Preferably, the transmission using the first transmission beam and the transmission using the second transmission beam may not overlap each other in the time domain within the CO.

Preferably, the CO may be started identically for multiple transmission beams.

Preferably, for the channel access, a back-off based third channel access procedure may be independently performed for each sensing beam before the start of the CO.

Preferably, an initial value of a random back-off counter in the third channel access procedure may be independently configured for each sensing beam.

Preferably, the wireless communication system may include a 3rd Generation Partnership Project (3GPP)-based wireless communication system.

Advantageous Effects of Invention

The present disclosure provides a method for efficiently transmitting signals in a wireless communication system and a device using the same. Furthermore, the present disclosure provides a channel access method for efficiently performing transmission in a wireless communication system and a device using the same.

The effect to be achieved by the present invention is not limited to the above-mentioned effects, and other effects not mentioned will be clearly understood by those of ordinary skill in the art from the following description.

BRIEF DESCRIPTION OF DRAWINGS

FIG. 1 illustrates an example of a wireless frame structure used in a wireless communication system.

FIG. 2 illustrates an example of a downlink (DL)/uplink (UL) slot structure in a wireless communication system.

FIG. 3 is a diagram for explaining a physical channel used in a 3GPP system and a typical signal transmission method using the physical channel.

FIG. 4 illustrates an SS/PBCH block for initial cell access in a 3GPP NR system.

FIG. 5 illustrates a procedure for transmitting control information and a control channel in a 3GPP NR system.

FIG. 6 illustrates a control resource set (CORESET) in which a physical downlink control channel (PUCCH) may be transmitted in a 3GPP NR system.

FIG. 7 illustrates a method for configuring a PDCCH search space in a 3GPP NR system.

FIG. 8 is a conceptual diagram illustrating carrier aggregation.

FIG. 9 is a diagram for explaining signal carrier communication and multiple carrier communication.

FIG. 10 is a diagram showing an example in which a cross carrier scheduling technique is applied.

FIG. 11 illustrates a New Radio-Unlicensed (NR-U) service environment.

FIG. 12 illustrates a communication method (e.g., wireless LAN) operating in an existing unlicensed band.

FIG. 13 illustrates a channel access procedure based on Category 4 LBT.

FIG. 14 is a block diagram illustrating configurations of a UE and a base station according to an embodiment of the present invention.

FIG. 15 illustrates an example of channel occupancy time (COT) configurations and a corresponding operation.

FIGS. 16 and 17 illustrate multiple beams wherein channel sensing/transmission is performed.

FIG. 18 illustrates a beam-based channel sensing/transmission method.

FIGS. 19 to 22 illustrate a beam-based channel sensing/transmission method according to the present disclosure.

BEST MODE FOR CARRYING OUT THE INVENTION

Terms used in the specification adopt general terms which are currently widely used as possible by considering functions in the present invention, but the terms may be changed depending on an intention of those skilled in the art, customs, and emergence of new technology. Further, in a specific case, there is a term arbitrarily selected by an applicant and in this case, a meaning thereof will be described in a corresponding description part of the invention. Accordingly, it intends to be revealed that a term used in the specification should be analyzed based on not just a name of the term but a substantial meaning of the term and contents throughout the specification.

Throughout this specification and the claims that follow, when it is described that an element is "connected" to another element, the element may be "directly connected" to the other element or "electrically connected" to the other element through a third element. Further, unless explicitly described to the contrary, the word "comprise" will be understood to imply the inclusion of stated elements but not the exclusion of any other elements unless otherwise stated. Moreover, limitations such as "more than or equal to" or "less than or equal to" based on a specific threshold may be appropriately substituted with "more than" or "less than", respectively, in some exemplary embodiments.

The following technology may be used in various wireless access systems, such as code division multiple access (CDMA), frequency division multiple access (FDMA), time division multiple access (TDMA), orthogonal frequency division multiple access (OFDMA), single carrier-FDMA (SC-FDMA), and the like. The CDMA may be implemented by a wireless technology such as universal terrestrial radio access (UTRA) or CDMA2000. The TDMA may be implemented by a wireless technology such as global system for mobile communications (GSM)/general packet radio service (GPRS)/enhanced data rates for GSM evolution (EDGE). The OFDMA may be implemented by a wireless technology such as IEEE 802.11 (Wi-Fi), IEEE 802.16 (WiMAX), IEEE 802-20, evolved UTRA (E-UTRA), and the like. The UTRA is a part of a universal mobile telecommunication system (UMTS). 3rd generation partnership project (3GPP) long term evolution (LTE) is a part of an evolved UMTS (E-UMTS) using evolved-UMTS terrestrial radio access (E-UTRA) and LTE-advanced (A) is an evolved version of the 3GPP LTE. 3GPP new radio (NR) is a system designed separately from LTE/LTE-A, and is a system for supporting enhanced mobile broadband (eMBB), ultra-reliable and low latency communication (URLLC), and massive machine type communication (mMTC) services, which are requirements of IMT-2020. For the clear description, 3GPP NR is mainly described, but the technical idea of the present invention is not limited thereto.

Unless otherwise specified herein, the base station may include a next generation node B (gNB) defined in 3GPP NR. Furthermore, unless otherwise specified, a terminal may include a user equipment (UE). Hereinafter, in order to help the understanding of the description, each content is described separately by the embodiments, but each embodiment may be used in combination with each other. In the present specification, the configuration of the UE may indicate a configuration by the base station. In more detail, the base station may configure a value of a parameter used in an operation of the UE or a wireless communication system by transmitting a channel or a signal to the UE.

FIG. 1 illustrates an example of a wireless frame structure used in a wireless communication system.

Referring to FIG. 1, the wireless frame (or radio frame) used in the 3GPP NR system may have a length of 10 ms ($\Delta f_{max} N_f/100)*T_c$). In addition, the wireless frame includes 10 subframes (SFs) having equal sizes. Herein, $\Delta f_{max}=480*103$ Hz, $N_f=4096$, $T_c=1/(\Delta f_{ref}*N_{f,ref})$, $\Delta f_{ref}=15*103$ Hz, and $N_{f,ref}=2048$. Numbers from 0 to 9 may be respectively allocated to 10 subframes within one wireless frame. Each subframe has a length of 1 ms and may include one or more slots according to a subcarrier spacing. More specifically, in the 3GPP NR system, the subcarrier spacing that may be used is 15*2-kHz, and u can have a value of $\mu=0, 1, 2, 3, 4$ as subcarrier spacing configuration. That is, 15 kHz, 30 kHz, 60 kHz, 120 kHz and 240 kHz may be used for subcarrier spacing. One subframe having a length of 1 ms may include $2^\mu$ slots. In this case, the length of each slot is $2^{-\mu}$ ms. Numbers from 0 to $2^\mu-1$ may be respectively allocated to $2^\mu$ slots within one wireless frame. In addition, numbers from 0 to $10*2^\mu-1$ may be respectively allocated to slots within one subframe. The time resource may be distinguished by at least one of a wireless frame number (also referred to as a wireless frame index), a subframe number (also referred to as a subframe index), and a slot number (or a slot index).

FIG. 2 illustrates an example of a downlink (DL)/uplink (UL) slot structure in a wireless communication system. In particular, FIG. 2 shows the structure of the resource grid of the 3GPP NR system.

There is one resource grid per antenna port. Referring to FIG. 2, a slot includes a plurality of orthogonal frequency division multiplexing (OFDM) symbols in a time domain and includes a plurality of resource blocks (RBs) in a frequency domain. An OFDM symbol also means one symbol section. Unless otherwise specified, OFDM symbols may be referred to simply as symbols. One RB includes 12 consecutive subcarriers in the frequency domain. Referring to FIG. 2, a signal transmitted from each slot may be represented by a resource grid including $N^{size,\mu}_{grid,x} * N^{RB}_{sc}$ subcarriers, and $N^{slot}_{symb}$ OFDM symbols. Here, x=DL when the signal is a DL signal, and x=UL when the signal is an UL signal. $N^{size,\mu}_{grid,x}$ represents the number of resource blocks (RBs) according to the subcarrier spacing constituent $\mu$ (x is DL or UL), and $N^{slot}_{symb}$ represents the number of OFDM symbols in a slot. $N^{RB}_{sc}$ is the number of subcarriers constituting one RB and $N^{RB}_{sc}=12$. An OFDM symbol may be referred to as a cyclic shift OFDM (CP-OFDM) symbol or a discrete Fourier transform spread OFDM (DFT-s-OFDM) symbol according to a multiple access scheme.

The number of OFDM symbols included in one slot may vary according to the length of a cyclic prefix (CP). For example, in the case of a normal CP, one slot includes 14 OFDM symbols, but in the case of an extended CP, one slot may include 12 OFDM symbols. In a specific embodiment, the extended CP can only be used at 60 kHz subcarrier spacing. In FIG. 2, for convenience of description, one slot is configured with 14 OFDM symbols by way of example, but embodiments of the present disclosure may be applied in a similar manner to a slot having a different number of OFDM symbols. Referring to FIG. 2, each OFDM symbol includes $N^{size,\mu}_{grid,x} * N^{RB}_{sc}$ subcarriers in the frequency domain. The type of subcarrier may be divided into a data subcarrier for data transmission, a reference signal subcarrier for transmission of a reference signal, and a guard band. The carrier frequency is also referred to as the center frequency (fc).

One RB may be defined by $N^{RB}_{sc}$ (e. g., 12) consecutive subcarriers in the frequency domain. For reference, a resource configured with one OFDM symbol and one subcarrier may be referred to as a resource element (RE) or a tone. Therefore, one RB can be configured with $N^{slot}_{symb} * N^{RB}_{sc}$ resource elements. Each resource element in the resource grid can be uniquely defined by a pair of indexes (k, l) in one slot. k may be an index assigned from 0 to $N^{size,\mu}_{grid,x} * N^{RB}_{sc} - 1$ in the frequency domain, and l may be an index assigned from 0 to $N^{slot}_{symb} - 1$ in the time domain.

In order for the UE to receive a signal from the base station or to transmit a signal to the base station, the time/frequency of the UE may be synchronized with the time/frequency of the base station. This is because when the base station and the UE are synchronized, the UE can determine the time and frequency parameters necessary for demodulating the DL signal and transmitting the UL signal at the correct time.

Each symbol of a radio frame used in a time division duplex (TDD) or an unpaired spectrum may be configured with at least one of a DL symbol, an UL symbol, and a flexible symbol. A radio frame used as a DL carrier in a frequency division duplex (FDD) or a paired spectrum may be configured with a DL symbol or a flexible symbol, and a radio frame used as a UL carrier may be configured with a UL symbol or a flexible symbol. In the DL symbol, DL transmission is possible, but UL transmission is impossible. In the UL symbol, UL transmission is possible, but DL transmission is impossible. The flexible symbol may be determined to be used as a DL or an UL according to a signal.

Information on the type of each symbol, i.e., information representing any one of DL symbols, UL symbols, and flexible symbols, may be configured with a cell-specific or common radio resource control (RRC) signal. In addition, information on the type of each symbol may additionally be configured with a UE-specific or dedicated RRC signal. The base station informs, by using cell-specific RRC signals, i) the period of cell-specific slot configuration, ii) the number of slots with only DL symbols from the beginning of the period of cell-specific slot configuration, iii) the number of DL symbols from the first symbol of the slot immediately following the slot with only DL symbols, iv) the number of slots with only UL symbols from the end of the period of cell specific slot configuration, and v) the number of UL symbols from the last symbol of the slot immediately before the slot with only the UL symbol. Here, symbols not configured with any one of a UL symbol and a DL symbol are flexible symbols.

When the information on the symbol type is configured with the UE-specific RRC signal, the base station may signal whether the flexible symbol is a DL symbol or an UL symbol in the cell-specific RRC signal. In this case, the UE-specific RRC signal can not change a DL symbol or a UL symbol configured with the cell-specific RRC signal into another symbol type. The UE-specific RRC signal may signal the number of DL symbols among the $N^{slot}_{symb}$ symbols of the corresponding slot for each slot, and the number of UL symbols among the $N^{slot}_{symb}$ symbols of the corresponding slot. In this case, the DL symbol of the slot may be continuously configured with the first symbol to the i-th symbol of the slot. In addition, the UL symbol of the slot may be continuously configured with the j-th symbol to the last symbol of the slot (where i<j). In the slot, symbols not configured with any one of a UL symbol and a DL symbol are flexible symbols.

The type of symbol configured with the above RRC signal may be referred to as a semi-static DL/UL configuration. In the semi-static DL/UL configuration previously configured with RRC signals, the flexible symbol may be indicated as a DL symbol, an UL symbol, or a flexible symbol through dynamic slot format information (SFI) transmitted on a physical DL control channel (PDCCH). In this case, the DL symbol or UL symbol configured with the RRC signal is not changed to another symbol type. Table 1 exemplifies the dynamic SFI that the base station can indicate to the UE.

TABLE 1

| | Symbol number in a slot | | | | | | | | | | | | | | | Symbol number in a slot | | | | | | | | | | | | | |
|---|---|---|---|---|---|---|---|---|---|---|---|---|---|---|---|---|---|---|---|---|---|---|---|---|---|---|---|---|---|
| index | 0 | 1 | 2 | 3 | 4 | 5 | 6 | 7 | 8 | 9 | 10 | 11 | 12 | 13 | index | 0 | 1 | 2 | 3 | 4 | 5 | 6 | 7 | 8 | 9 | 10 | 11 | 12 | 13 |
| 0 | D | D | D | D | D | D | D | D | D | D | D | D | D | D | 28 | D | D | D | D | D | D | D | D | D | D | D | D | X | U |
| 1 | U | U | U | U | U | U | U | U | U | U | U | U | U | U | 29 | D | D | D | D | D | D | D | D | D | D | D | X | X | U |
| 2 | X | X | X | X | X | X | X | X | X | X | X | X | X | X | 30 | D | D | D | D | D | D | D | D | D | D | X | X | X | U |
| 3 | D | D | D | D | D | D | D | D | D | D | D | D | D | X | 31 | D | D | D | D | D | D | D | D | D | D | D | X | U | U |
| 4 | D | D | D | D | D | D | D | D | D | D | D | D | X | X | 32 | D | D | D | D | D | D | D | D | D | X | X | U | U |
| 5 | D | D | D | D | D | D | D | D | D | D | D | X | X | X | 33 | D | D | D | D | D | D | D | D | X | X | X | U | U | U |
| 6 | D | D | D | D | D | D | D | D | D | D | X | X | X | X | 34 | D | X | U | U | U | U | U | U | U | U | U | U | U | U |
| 7 | D | D | D | D | D | D | D | D | D | X | X | X | X | X | 35 | D | D | X | U | U | U | U | U | U | U | U | U | U | U |
| 8 | X | X | X | X | X | X | X | X | X | X | X | X | X | U | 36 | D | D | D | X | U | U | U | U | U | U | U | U | U | U |
| 9 | X | X | X | X | X | X | X | X | X | X | X | X | U | U | 37 | D | X | X | U | U | U | U | U | U | U | U | U | U | U |
| 10 | X | U | U | U | U | U | U | U | U | U | U | U | U | U | 38 | D | D | X | X | U | U | U | U | U | U | U | U | U | U |
| 11 | X | X | U | U | U | U | U | U | U | U | U | U | U | U | 39 | D | D | D | X | X | U | U | U | U | U | U | U | U | U |
| 12 | X | X | X | U | U | U | U | U | U | U | U | U | U | U | 40 | D | X | X | X | U | U | U | U | U | U | U | U | U | U |
| 13 | X | X | X | X | U | U | U | U | U | U | U | U | U | U | 41 | D | D | X | X | X | U | U | U | U | U | U | U | U | U |
| 14 | X | X | X | X | X | U | U | U | U | U | U | U | U | U | 42 | D | D | D | X | X | X | U | U | U | U | U | U | U | U |
| 15 | X | X | X | X | X | X | U | U | U | U | U | U | U | U | 43 | D | D | D | D | D | D | D | D | X | X | X | X | U |
| 16 | D | X | X | X | X | X | X | X | X | X | X | X | X | X | 44 | D | D | D | D | D | X | X | X | X | X | U | U |
| 17 | D | D | X | X | X | X | X | X | X | X | X | X | X | X | 45 | D | D | D | D | D | D | X | X | U | U | U | U | U |
| 18 | D | D | D | X | X | X | X | X | X | X | X | X | X | X | 46 | D | D | D | D | X | U | D | D | D | D | X | U |
| 19 | D | X | X | X | X | X | X | X | X | X | X | X | X | U | 47 | D | X | U | U | U | D | X | U | U | U |
| 20 | D | D | X | X | X | X | X | X | X | X | X | X | X | U | 48 | D | X | U | U | U | U | D | X | U | U | U | U |
| 21 | D | D | D | X | X | X | X | X | X | X | X | X | X | U | 49 | D | D | X | U | U | D | D | D | X | U |
| 22 | D | X | X | X | X | X | X | X | X | X | X | X | U | U | 50 | D | D | X | U | U | U | D | D | X | X | U | U |

TABLE 1-continued

| | Symbol number in a slot | | | | | | | | | | | | | | | Symbol number in a slot | | | | | | | | | | | | | |
|---|---|---|---|---|---|---|---|---|---|---|---|---|---|---|---|---|---|---|---|---|---|---|---|---|---|---|---|---|---|
| index | 0 | 1 | 2 | 3 | 4 | 5 | 6 | 7 | 8 | 9 | 10 | 11 | 12 | 13 | index | 0 | 1 | 2 | 3 | 4 | 5 | 6 | 7 | 8 | 9 | 10 | 11 | 12 | 13 |
| 23 | D | D | X | X | X | X | X | X | X | X | X | X | U | U | 51 | D | X | X | U | U | U | U | D | X | X | U | U | U | U |
| 24 | D | D | D | X | X | X | X | X | X | X | X | X | U | U | 52 | D | X | X | X | X | X | U | D | X | X | X | X | X | U |
| 25 | D | X | X | X | X | X | X | X | X | X | U | U | U | U | 53 | D | D | X | X | X | X | U | D | D | X | X | X | X | U |
| 26 | D | D | X | X | X | X | X | X | X | X | U | U | U | U | 54 | X | X | X | X | X | X | D | D | D | D | D | D | D | D |
| 27 | D | D | D | X | X | X | X | X | X | X | U | U | U | U | 55 | D | D | X | X | X | U | U | U | D | D | D | D | D | D |
| 56~255 | | | | | | | | | | | | | | | Reserved | | | | | | | | | | | | | | |

In Table 1, D denotes a DL symbol, U denotes a UL symbol, and X denotes a flexible symbol. As shown in Table 1, up to two DL/UL switching in one slot may be allowed.

FIG. 3 is a diagram for explaining a physical channel used in a 3GPP system (e.g., NR) and a typical signal transmission method using the physical channel.

If the power of the UE is turned on or the UE camps on a new cell, the UE performs an initial cell search (S101). Specifically, the UE may synchronize with the BS in the initial cell search. For this, the UE may receive a primary synchronization signal (PSS) and a secondary synchronization signal (SSS) from the base station to synchronize with the base station, and obtain information such as a cell ID. Thereafter, the UE can receive the physical broadcast channel from the base station and obtain the broadcast information in the cell.

Upon completion of the initial cell search, the UE receives a physical downlink shared channel (PDSCH) according to the physical downlink control channel (PDCCH) and information in the PDCCH, so that the UE can obtain more specific system information than the system information obtained through the initial cell search (S102). Herein, the system information received by the UE is cell-common system information for normal operating of the UE in a physical layer in radio resource control (RRC) and is referred to remaining system information, or system information block (SIB) 1 is called.

When the UE initially accesses the base station or does not have radio resources for signal transmission (i.e. the UE at RRC_IDLE mode), the UE may perform a random access procedure on the base station (operations S103 to S106). First, the UE can transmit a preamble through a physical random access channel (PRACH) (S103) and receive a response message for the preamble from the base station through the PDCCH and the corresponding PDSCH (S104). When a valid random access response message is received by the UE, the UE transmits data including the identifier of the UE and the like to the base station through a physical uplink shared channel (PUSCH) indicated by the UL grant transmitted through the PDCCH from the base station (S105). Next, the UE waits for reception of the PDCCH as an indication of the base station for collision resolution. If the UE successfully receives the PDCCH through the identifier of the UE (S106), the random access process is terminated. The UE may obtain UE-specific system information for normal operating of the UE in the physical layer in RRC layer during a random access process. When the UE obtain the UE-specific system information, the UE enter RRC connecting mode (RRC_CONNECTED mode).

The RRC layer is used for generating or managing message for controlling connection between the UE and radio access network (RAN). In more detail, the base station and the UE, in the RRC layer, may perform broadcasting cell system information required by every UE in the cell, managing mobility and handover, measurement report of the UE, storage management including UE capability management and device management. In general, the RRC signal is not changed and maintained quite long interval since a period of an update of a signal delivered in the RRC layer is longer than a transmission time interval (TTI) in physical layer.

After the above-described procedure, the UE receives PDCCH/PDSCH (S107) and transmits a physical uplink shared channel (PUSCH)/physical uplink control channel (PUCCH) (S108) as a general UL/DL signal transmission procedure. In particular, the UE may receive downlink control information (DCI) through the PDCCH. The DCI may include control information such as resource allocation information for the UE. Also, the format of the DCI may vary depending on the intended use. The uplink control information (UCI) that the UE transmits to the base station through UL includes a DL/UL ACK/NACK signal, a channel quality indicator (CQI), a precoding matrix index (PMI), a rank indicator (RI), and the like. Here, the CQI, PMI, and RI may be included in channel state information (CSI). In the 3GPP NR system, the UE may transmit control information such as HARQ-ACK and CSI described above through the PUSCH and/or PUCCH.

FIG. 4 illustrates an SS/PBCH block for initial cell access in a 3GPP NR system.

When the power is turned on or wanting to access a new cell, the UE may obtain time and frequency synchronization with the cell and perform an initial cell search procedure. The UE may detect a physical cell identity $N^{cell}_{ID}$ of the cell during a cell search procedure. For this, the UE may receive a synchronization signal, for example, a primary synchronization signal (PSS) and a secondary synchronization signal (SSS), from a base station, and synchronize with the base station. In this case, the UE can obtain information such as a cell identity (ID).

Referring to FIG. 4A, a synchronization signal (SS) will be described in more detail. The synchronization signal can be classified into PSS and SSS. The PSS may be used to obtain time domain synchronization and/or frequency domain synchronization, such as OFDM symbol synchronization and slot synchronization. The SSS can be used to obtain frame synchronization and cell group ID. Referring to FIG. 4A and Table 2, the SS/PBCH block can be configured with consecutive 20 RBs (=240 subcarriers) in the frequency axis, and can be configured with consecutive 4 OFDM symbols in the time axis. In this case, in the SS/PBCH block, the PSS is transmitted in the first OFDM symbol and the SSS is transmitted in the third OFDM symbol through the 56th to 182th subcarriers. Here, the lowest subcarrier index of the SS/PBCH block is numbered from 0. In the first OFDM symbol in which the PSS is transmitted, the base station does not transmit a signal through the remaining subcarriers, i.e., 0th to 55th and 183th to 239th subcarriers. In addition, in the third OFDM symbol in which the SSS is transmitted, the base station does not transmit a signal through 48th to 55th and 183th to 191th subcarriers. The base station transmits a physical broadcast channel (PBCH) through the remaining RE except for the above signal in the SS/PBCH block.

TABLE 2

| Channel or signal | OFDM symbol number l relative to the start of an SS/PBCH block | Subcarrier number k relative to the start of an SS/PBCH block |
| --- | --- | --- |
| PSS | 0 | 56, 57, . . . , 182 |
| SSS | 2 | 56, 57, . . . . 182 |
| Set to 0 | 0 | 0, 1, . . . , 55, 183, 184, . . . , 239 |
|  | 2 | 48, 49, . . . , 55, 183, 184, . . . , 191 |
| PBCH | 1, 3 | 0, 1, . . . , 239 |
|  | 2 | 0, 1, . . . , 47, 192, 193, . . . , 239 |
| DM-RS for PBCH | 1, 3 | 0 + v, 4 + v, 8 + v, . . . , 236 + v |
|  | 2 | 0 + v, 4 + v, 8 + v, . . . , 44 + v 192 + v, 196 + v, . . . , 236 + v |

The SS allows a total of 1008 unique physical layer cell IDs to be grouped into 336 physical-layer cell-identifier groups, each group including three unique identifiers, through a combination of three PSSs and SSSs, specifically, such that each physical layer cell ID is to be only a part of one physical-layer cell-identifier group. Therefore, the physical layer cell ID $N^{cell}_{ID}=3N^{(1)}_{ID}+N^{(2)}_{ID}$ can be uniquely defined by the index $N^{(1)}_{ID}$ ranging from 0 to 335 indicating a physical-layer cell-identifier group and the index $N^{(2)}_{ID}$ ranging from 0 to 2 indicating a physical-layer identifier in the physical-layer cell-identifier group. The UE may detect the PSS and identify one of the three unique physical-layer identifiers. In addition, the UE can detect the SSS and identify one of the 336 physical layer cell IDs associated with the physical-layer identifier. In this case, the sequence $d_{PSS}(n)$ of the PSS is as follows.

$$d_{PSS}(n) = 1 - 2x(m)$$

$$m = \left(n + 43N^{(2)}_{ID}\right) \bmod 127$$

$$0 \le n < 127$$

Here, $$x(i+7) = (x(i+4) + x(i)) \bmod 2$$

and is given as $$[x(6)\ x(5)\ x(4)\ x(3)\ x(2)\ x(1)\ x(0)] = [1\ 1\ 1\ 0\ 1\ 1\ 0]$$

Further, the sequence $d_{SSS}(n)$ of the SSS is as follows.

$$d_{SSS}(n) = [1 - 2x_0((n + m_0) \bmod 127)][1 - 2x_1((n + m_1) \bmod 127)] \quad [76]$$

$$m_0 = 15 \left\lfloor \frac{N^{(1)}_{ID}}{112} \right\rfloor + 5N^{(2)}_{ID}$$

$$m_1 = N^{(1)}_{ID} \bmod 112$$

$$0 \le n < 127$$

$$x_0(i+7) = (x_0(i+4) + x_0(i)) \bmod 2$$

$$x_1(i+7) = (x_1(i+1) + x_1(i)) \bmod 2$$

Here, and is given as $$[x_0(6)\ x_0(5)\ x_0(4)\ x_0(3)\ x_0(2)\ x_0(1)\ x_0(0)] = [0\ 0\ 0\ 0\ 0\ 0\ 1]$$

$$[x_1(6)\ x_1(5)\ x_1(4)\ x_1(3)\ x_1(2)\ x_1(1)\ x_1(0)] = [0\ 0\ 0\ 0\ 0\ 0\ 1]$$

A radio frame with a 10 ms length may be divided into two half frames with a 5 ms length. Referring to FIG. 4B, a description will be made of a slot in which SS/PBCH blocks are transmitted in each half frame. A slot in which the SS/PBCH block is transmitted may be any one of the cases A, B, C, D, and E. In the case A, the subcarrier spacing is 15 kHz and the starting time point of the SS/PBCH block is the ({2, 8}+14*n)-th symbol. In this case, n=0 or 1 at a carrier frequency of 3 GHz or less. In addition, it may be n=0, 1, 2, 3 at carrier frequencies above 3 GHz and below 6 GHz. In the case B, the subcarrier spacing is 30 kHz and the starting time point of the SS/PBCH block is {4, 8, 16, 20}+28*n. In this case, n=0 at a carrier frequency of 3 GHz or less. In addition, it may be n=0, 1 at carrier frequencies above 3 GHz and below 6 GHz. In the case C, the subcarrier spacing is 30 kHz and the starting time point of the SS/PBCH block is the ({2, 8}+14*n)-th symbol. In this case, n=0 or 1 at a carrier frequency of 3 GHz or less. In addition, it may be n=0, 1, 2, 3 at carrier frequencies above 3 GHz and below 6 GHz. In the case D, the subcarrier spacing is 120 kHz and the starting time point of the SS/PBCH block is the ({4, 8, 16, 20}+28*n)-th symbol. In this case, at a carrier frequency of 6 GHz or more, n=0, 1, 2, 3, 5, 6, 7, 8, 10, 11, 12, 13, 15, 16, 17, 18. In the case E, the subcarrier spacing is 240 kHz and the starting time point of the SS/PBCH block is the ({8, 12, 16, 20, 32, 36, 40, 44}+56*n)-th symbol. In this case, at a carrier frequency of 6 GHZ or more, n=0, 1, 2, 3, 5, 6, 7, 8.

FIG. 5 illustrates a procedure for transmitting control information and a control channel in a 3GPP NR system. Referring to FIG. 5A, the base station may add a cyclic redundancy check (CRC) masked (e.g., an XOR operation) with a radio network temporary identifier (RNTI) to control information (e.g., downlink control information (DCI)) (S202).

The base station may scramble the CRC with an RNTI value determined according to the purpose/target of each control information. The common RNTI used by one or more UEs can include at least one of a system information RNTI (SI-RNTI), a paging RNTI (P-RNTI), a random access RNTI (RA-RNTI), and a transmit power control RNTI (TPC-RNTI). In addition, the UE-specific RNTI may include at least one of a cell temporary RNTI (C-RNTI), and the CS-RNTI. Thereafter, the base station may perform rate-matching (S206) according to the amount of resource(s) used for PDCCH transmission after performing channel encoding (e.g., polar coding) (S204). Thereafter, the base station may multiplex the DCI(s) based on the control channel element (CCE) based PDCCH structure (S208). In addition, the base station may apply an additional process (S210) such as scrambling, modulation (e.g., QPSK), inter-leaving, and the like to the multiplexed DCI(s), and then map the DCI(s) to the resource to be transmitted. The CCE is a basic resource unit for the PDCCH, and one CCE may include a plurality (e.g., six) of resource element groups (REGs). One REG may be configured with a plurality (e.g., 12) of REs. The number of CCEs used for one PDCCH may be defined as an aggregation level. In the 3GPP NR system, an aggregation level of 1, 2, 4, 8, or 16 may be used. FIG. 5B is a diagram related to a CCE aggregation level and the multiplexing of a PDCCH and illustrates the type of a CCE aggregation level used for one PDCCH and CCE(s) transmitted in the control area according thereto.

FIG. 6 illustrates a control resource set (CORESET) in which a physical downlink control channel (PUCCH) may be transmitted in a 3GPP NR system.

The CORESET is a time-frequency resource in which PDCCH, that is, a control signal for the UE, is transmitted. In addition, a search space to be described later may be mapped to one CORESET. Therefore, the UE may monitor the time-frequency domain designated as CORESET instead of monitoring all frequency bands for PDCCH reception, and decode the PDCCH mapped to CORESET. The base station may configure one or more CORESETs for each cell to the UE. The CORESET may be configured with up to three consecutive symbols on the time axis. In addition, the CORESET may be configured in units of six consecutive PRBs on the frequency axis. In the embodiment of FIG. 5, CORESET #1 is configured with consecutive PRBs, and CORESET #2 and CORESET #3 are configured with discontinuous PRBs. The CORESET can be located in any symbol in the slot. For example, in the embodiment of FIG. 5, CORESET #1 starts at the first symbol of the slot, CORESET #2 starts at the fifth symbol of the slot, and CORESET #9 starts at the ninth symbol of the slot.

FIG. 7 illustrates a method for setting a PUCCH search space in a 3GPP NR system.

In order to transmit the PDCCH to the UE, each CORESET may have at least one search space. In the embodiment of the present disclosure, the search space is a set of all time-frequency resources (hereinafter, PDCCH candidates) through which the PDCCH of the UE is capable of being transmitted. The search space may include a common search space that the UE of the 3GPP NR is required to commonly search and a UE-specific or a UE-specific search space that a specific UE is required to search. In the common search space, UE may monitor the PDCCH that is set so that all UEs in the cell belonging to the same base station commonly search. In addition, the UE-specific search space may be set for each UE so that UEs monitor the PDCCH allocated to each UE at different search space position according to the UE. In the case of the UE-specific search space, the search space between the UEs may be partially overlapped and allocated due to the limited control area in which the PDCCH may be allocated. Monitoring the PDCCH includes blind decoding for PDCCH candidates in the search space. When the blind decoding is successful, it may be expressed that the PDCCH is (successfully) detected/received and when the blind decoding fails, it may be expressed that the PDCCH is not detected/not received, or is not successfully detected/received.

For convenience of explanation, a PDCCH scrambled with a group common (GC) RNTI previously known to one or more UEs so as to transmit DL control information to the one or more UEs is referred to as a group common (GC) PDCCH or a common PDCCH. In addition, a PDCCH scrambled with a specific-terminal RNTI that a specific UE already knows so as to transmit UL scheduling information or DL scheduling information to the specific UE is referred to as a specific-UE PDCCH. The common PDCCH may be included in a common search space, and the UE-specific PDCCH may be included in a common search space or a UE-specific PDCCH.

The base station may signal each UE or UE group through a PDCCH about information (i.e., DL Grant) related to resource allocation of a paging channel (PCH) and a downlink-shared channel (DL-SCH) that are a transmission channel or information (i.e., UL grant) related to resource allocation of a uplink-shared channel (UL-SCH) and a hybrid automatic repeat request (HARQ). The base station may transmit the PCH transport block and the DL-SCH transport block through the PDSCH. The base station may transmit data excluding specific control information or specific service data through the PDSCH. In addition, the UE may receive data excluding specific control information or specific service data through the PDSCH.

The base station may include, in the PDCCH, information on to which UE (one or a plurality of UEs) PDSCH data is transmitted and how the PDSCH data is to be received and decoded by the corresponding UE, and transmit the PDCCH. For example, it is assumed that the DCI transmitted on a specific PDCCH is CRC masked with an RNTI of "A", and the DCI indicates that PDSCH is allocated to a radio resource (e.g., frequency location) of "B" and indicates transmission format information (e.g., transport block size, modulation scheme, coding information, etc.) of "C". The UE monitors the PDCCH using the RNTI information that the UE has. In this case, if there is a UE which performs blind decoding the PDCCH using the "A" RNTI, the UE receives the PDCCH, and receives the PDSCH indicated by "B" and "C" through the received PDCCH information.

Table 3 shows an embodiment of a physical uplink control channel (PUCCH) used in a wireless communication system.

TABLE 3

| PUCCH format | Length in OFDM symbols | Number of bits |
| --- | --- | --- |
| 0 | 1-2 | ≤2 |
| 1 | 4-14 | ≤2 |
| 2 | 1-2 | >2 |
| 3 | 4-14 | >2 |
| 4 | 4-14 | >2 |

The PUCCH may be used to transmit the following UL control information (UCI).

Scheduling Request (SR): Information used for requesting a UL UL-SCH resource.

HARQ-ACK: A Response to PDCCH (indicating DL SPS release) and/or a response to DL transport block (TB) on PDSCH. HARQ-ACK indicates whether information successfully transmitted on the PDCCH or PDSCH is received. The HARQ-ACK response includes positive ACK (simply ACK), negative ACK (hereinafter NACK), Discontinuous Transmission (DTX), or NACK/DTX. Here, the term HARQ-ACK is used mixed with HARQ-ACK/NACK and ACK/NACK. In general, ACK may be represented by bit value 1 and NACK may be represented by bit value 0.

Channel State Information (CSI): Feedback information on the DL channel. The UE generates it based on the CSI-Reference Signal (RS) transmitted by the base station. Multiple Input Multiple Output (MIMO)-related feedback information includes a Rank Indicator (RI) and a Precoding Matrix Indicator (PMI). CSI can be divided into CSI part 1 and CSI part 2 according to the information indicated by CSI.

In the 3GPP NR system, five PUCCH formats may be used to support various service scenarios, various channel environments, and frame structures.

PUCCH format 0 is a format capable of delivering 1-bit or 2-bit HARQ-ACK information or SR. PUCCH format 0 can be transmitted through one or two OFDM symbols on the time axis and one PRB on the frequency axis. When PUCCH format 0 is transmitted in two OFDM symbols, the same sequence on the two symbols may be transmitted through different RBs. In this case, the sequence may be a sequence cyclic shifted (CS) from a base sequence used in PUCCH format 0. Through this, the UE may obtain a frequency diversity gain. In more detail, the UE may determine a cyclic shift (CS) value $m_{cs}$ according to $M_{bit}$ bit UCI ($M_{bit}$=1 or 2). In addition, the base sequence having the length of 12 may be transmitted by mapping a cyclic shifted sequence based on a predetermined CS value $m_{cs}$ to one OFDM symbol and 12 REs of one RB. When the number of cyclic shifts available to the UE is 12 and $M_{bit}=1$, 1 bit UCI 0 and 1 may be mapped to two cyclic shifted sequences having a difference of 6 in the cyclic shift value, respectively. In addition, when $M_{bit}=2$, 2 bit UCI 00, 01, 11, and 10 may be mapped to four cyclic shifted sequences having a difference of 3 in cyclic shift values, respectively.

PUCCH format 1 may deliver 1-bit or 2-bit HARQ-ACK information or SR. PUCCH format 1 maybe transmitted through consecutive OFDM symbols on the time axis and one PRB on the frequency axis. Here, the number of OFDM symbols occupied by PUCCH format 1 may be one of 4 to 14. More specifically, UCI, which is $M_{bit}=1$, may be BPSK-modulated. The UE may modulate UCI, which is $M_{bit}=2$, with quadrature phase shift keying (QPSK). A signal is obtained by multiplying a modulated complex valued symbol d(0) by a sequence of length 12. In this case, the sequence may be a base sequence used for PUCCH format 0. The UE spreads the even-numbered OFDM symbols to which PUCCH format 1 is allocated through the time axis orthogonal cover code (OCC) to transmit the obtained signal. PUCCH format 1 determines the maximum number of different UEs multiplexed in the one RB according to the length of the OCC to be used. A demodulation reference signal (DMRS) may be spread with OCC and mapped to the odd-numbered OFDM symbols of PUCCH format 1.

PUCCH format 2 may deliver UCI exceeding 2 bits. PUCCH format 2 may be transmitted through one or two OFDM symbols on the time axis and one or a plurality of RBs on the frequency axis. When PUCCH format 2 is transmitted in two OFDM symbols, the sequences which are transmitted in different RBs through the two OFDM symbols may be same each other. Here, the sequence may be a plurality of modulated complex valued symbols d(0), . . . , $d(M_{symbol}-1)$. Here, $M_{symbol}$ may be $M_{bit}/2$. Through this, the UE may obtain a frequency diversity gain. More specifically, $M_{bit}$ bit UCI ($M_{bit}>2$) is bit-level scrambled, QPSK modulated, and mapped to RB(s) of one or two OFDM symbol(s). Here, the number of RBs may be one of 1 to 16.

PUCCH format 3 or PUCCH format 4 may deliver UCI exceeding 2 bits. PUCCH format 3 or PUCCH format 4 may be transmitted through consecutive OFDM symbols on the time axis and one PRB on the frequency axis. The number of OFDM symbols occupied by PUCCH format 3 or PUCCH format 4 may be one of 4 to 14. Specifically, the UE modulates $M_{bit}$ bits UCI ($M_{bit}>2$) with π/2-Binary Phase Shift Keying (BPSK) or QPSK to generate a complex valued symbol d(0) to $d(M_{symb}-1)$. Here, when using π/2-BPSK, $M_{symb}=M_{bit}$, and when using QPSK, $M_{symb}=M_{bit}/2$. The UE may not apply block-unit spreading to the PUCCH format 3. However, the UE may apply block-unit spreading to one RB (i.e., 12 subcarriers) using PreDFT-OCC of a length of 12 such that PUCCH format 4 may have two or four multiplexing capacities. The UE performs transmit precoding (or DFT-precoding) on the spread signal and maps it to each RE to transmit the spread signal.

In this case, the number of RBs occupied by PUCCH format 2, PUCCH format 3, or PUCCH format 4 may be determined according to the length and maximum code rate of the UCI transmitted by the UE. When the UE uses PUCCH format 2, the UE may transmit HARQ-ACK information and CSI information together through the PUCCH. When the number of RBs that the UE may transmit is greater than the maximum number of RBs that PUCCH format 2, or PUCCH format 3 or PUCCH format 4 may use, the UE may transmit only the remaining UCI information without transmitting some UCI information according to the priority of the UCI information.

PUCCH format 1, PUCCH format 3, or PUCCH format 4 may be configured through the RRC signal to indicate frequency hopping in a slot. When frequency hopping is configured, the index of the RB to be frequency hopped may be configured with an RRC signal. When PUCCH format 1, PUCCH format 3, or PUCCH format 4 is transmitted through N OFDM symbols on the time axis, the first hop may have floor (N/2) OFDM symbols and the second hop may have ceiling (N/2) OFDM symbols.

PUCCH format 1, PUCCH format 3, or PUCCH format 4 may be configured to be repeatedly transmitted in a plurality of slots. In this case, the number K of slots in which the PUCCH is repeatedly transmitted may be configured by the RRC signal. The repeatedly transmitted PUCCHs must start at an OFDM symbol of the constant position in each slot, and have the constant length. When one OFDM symbol among OFDM symbols of a slot in which a UE should transmit a PUCCH is indicated as a DL symbol by an RRC signal, the UE may not transmit the PUCCH in a corresponding slot and delay the transmission of the PUCCH to the next slot to transmit the PUCCH.

Meanwhile, in the 3GPP NR system, a UE may perform transmission/reception using a bandwidth equal to or less than the bandwidth of a carrier (or cell). For this, the UE may receive the Bandwidth part (BWP) configured with a continuous bandwidth of some of the carrier's bandwidth. A UE operating according to TDD or operating in an unpaired spectrum can receive up to four DL/UL BWP pairs in one carrier (or cell). In addition, the UE may activate one DL/UL BWP pair. A UE operating according to FDD or operating in paired spectrum can receive up to four DL BWPs on a DL carrier (or cell) and up to four UL BWPs on a UL carrier (or cell). The UE may activate one DL BWP and one UL BWP for each carrier (or cell). The UE may not perform reception or transmission in a time-frequency resource other than the activated BWP. The activated BWP may be referred to as an active BWP.

The base station may indicate the activated BWP among the BWPs configured by the UE through downlink control information (DCI). The BWP indicated through the DCI is activated and the other configured BWP(s) are deactivated. In a carrier (or cell) operating in TDD, the base station may include, in the DCI for scheduling PDSCH or PUSCH, a bandwidth part indicator (BPI) indicating the BWP to be activated to change the DL/UL BWP pair of the UE. The UE may receive the DCI for scheduling the PDSCH or PUSCH and may identify the DL/UL BWP pair activated based on the BPI. For a DL carrier (or cell) operating in an FDD, the base station may include a BPI indicating the BWP to be activated in the DCI for scheduling PDSCH so as to change the DL BWP of the UE. For a UL carrier (or cell) operating in an FDD, the base station may include a BPI indicating the BWP to be activated in the DCI for scheduling PUSCH so as to change the UL BWP of the UE.

FIG. 8 is a conceptual diagram illustrating carrier aggregation.

The carrier aggregation is a method in which the UE uses a plurality of frequency blocks or cells (in the logical sense) configured with UL resources (or component carriers) and/or DL resources (or component carriers) as one large logical frequency band in order for a wireless communication system to use a wider frequency band. One component carrier may also be referred to as a term called a Primary cell (PCell) or a Secondary cell (SCell), or a Primary SCell (PScell). However, hereinafter, for convenience of description, the term "component carrier" is used.

Referring to FIG. 8, as an example of a 3GPP NR system, the entire system band may include up to 16 component carriers, and each component carrier may have a bandwidth of up to 400 MHZ. The component carrier may include one or more physically consecutive subcarriers. Although it is shown in FIG. 8 that each of the component carriers has the same bandwidth, this is merely an example, and each component carrier may have a different bandwidth. Also, although each component carrier is shown as being adjacent to each other in the frequency axis, the drawings are shown in a logical concept, and each component carrier may be physically adjacent to one another, or may be spaced apart.

Different center frequencies may be used for each component carrier. Also, one common center frequency may be used in physically adjacent component carriers. Assuming that all the component carriers are physically adjacent in the embodiment of FIG. 8, center frequency A may be used in all the component carriers. Further, assuming that the respective component carriers are not physically adjacent to each other, center frequency A and the center frequency B can be used in each of the component carriers.

When the total system band is extended by carrier aggregation, the frequency band used for communication with each UE can be defined in units of a component carrier. UE A may use 100 MHz, which is the total system band, and performs communication using all five component carriers. UEs B1~B5 can use only a 20 MHz bandwidth and perform communication using one component carrier. UEs C1 and C2 may use a 40 MHz bandwidth and perform communication using two component carriers, respectively. The two component carriers may be logically/physically adjacent or non-adjacent. UE C1 represents the case of using two non-adjacent component carriers, and UE C2 represents the case of using two adjacent component carriers.

FIG. 9 is a drawing for explaining signal carrier communication and multiple carrier communication. Particularly, FIG. 9A shows a single carrier subframe structure and FIG. 9B shows a multi-carrier subframe structure.

Referring to FIG. 9A, in an FDD mode, a general wireless communication system may perform data transmission or reception through one DL band and one UL band corresponding thereto. In another specific embodiment, in a TDD mode, the wireless communication system may divide a radio frame into a UL time unit and a DL time unit in a time domain, and perform data transmission or reception through a UL/DL time unit. Referring to FIG. 9B, three 20 MHz component carriers (CCs) can be aggregated into each of UL and DL, so that a bandwidth of 60 MHz can be supported. Each CC may be adjacent or non-adjacent to one another in the frequency domain. FIG. 9B shows a case where the bandwidth of the UL CC and the bandwidth of the DL CC are the same and symmetric, but the bandwidth of each CC can be determined independently. In addition, asymmetric carrier aggregation with different number of UL CCs and DL CCs is possible. A DL/UL CC allocated/configured to a specific UE through RRC may be called as a serving DL/UL CC of the specific UE.

The base station may perform communication with the UE by activating some or all of the serving CCs of the UE or deactivating some CCs. The base station can change the CC to be activated/deactivated, and change the number of CCs to be activated/deactivated. If the base station allocates a CC available for the UE as to be cell-specific or UE-specific, at least one of the allocated CCs can be deactivated, unless the CC allocation for the UE is completely reconfigured or the UE is handed over. One CC that is not deactivated by the UE is called as a Primary CC (PCC) or a primary cell (PCell), and a CC that the base station can freely activate/deactivate is called as a Secondary CC (SCC) or a secondary cell (SCell).

Meanwhile, 3GPP NR uses the concept of a cell to manage radio resources. A cell is defined as a combination of DL resources and UL resources, that is, a combination of DL CC and UL CC. A cell may be configured with DL resources alone, or a combination of DL resources and UL resources. When the carrier aggregation is supported, the linkage between the carrier frequency of the DL resource (or DL CC) and the carrier frequency of the UL resource (or UL CC) may be indicated by system information. The carrier frequency refers to the center frequency of each cell or CC. A cell corresponding to the PCC is referred to as a PCell, and a cell corresponding to the SCC is referred to as an SCell. The carrier corresponding to the PCell in the DL is the DL PCC, and the carrier corresponding to the PCell in the UL is the UL PCC. Similarly, the carrier corresponding to the SCell in the DL is the DL SCC and the carrier corresponding to the SCell in the UL is the UL SCC. According to UE capability, the serving cell(s) may be configured with one PCell and zero or more SCells. In the case of UEs that are in the RRC_CONNECTED state but not configured for carrier aggregation or that do not support carrier aggregation, there is only one serving cell configured only with PCell.

As mentioned above, the term "cell" used in carrier aggregation is distinguished from the term "cell" which refers to a certain geographical area in which a communication service is provided by one base station or one antenna group. That is, one component carrier may also be referred to as a scheduling cell, a scheduled cell, a primary cell (PCell), a secondary cell (SCell), or a primary SCell (PScell). However, in order to distinguish between a cell referring to a certain geographical area and a cell of carrier aggregation, in the present disclosure, a cell of a carrier aggregation is referred to as a CC, and a cell of a geographical area is referred to as a cell.

FIG. 10 is a diagram showing an example in which a cross carrier scheduling technique is applied. When cross carrier scheduling is set, the control channel transmitted through the first CC may schedule a data channel transmitted through the first CC or the second CC using a carrier indicator field (CIF). The CIF is included in the DCI. In other words, a scheduling cell is set, and the DL grant/UL grant transmitted in the PDCCH area of the scheduling cell schedules the PDSCH/PUSCH of the scheduled cell. That is, a search area for the plurality of component carriers exists in the PDCCH area of the scheduling cell. A PCell may be basically a scheduling cell, and a specific SCell may be designated as a scheduling cell by an upper layer.

In the embodiment of FIG. 10, it is assumed that three DL CCs are merged. Here, it is assumed that DL component carrier #0 is DL PCC (or PCell), and DL component carrier #1 and DL component carrier #2 are DL SCCs (or SCell). In addition, it is assumed that the DL PCC is set to the PDCCH monitoring CC. When cross-carrier scheduling is not configured by UE-specific (or UE-group-specific or cell-specific) higher layer signaling, a CIF is disabled, and each DL CC can transmit only a PDCCH for scheduling its PDSCH without the CIF according to an NR PDCCH rule (non-cross-carrier scheduling, self-carrier scheduling). Meanwhile, if cross-carrier scheduling is configured by UE-specific (or UE-group-specific or cell-specific) higher layer signaling, a CIF is enabled, and a specific CC (e.g., DL PCC)

may transmit not only the PDCCH for scheduling the PDSCH of the DL CC A using the CIF but also the PDCCH for scheduling the PDSCH of another CC (cross-carrier scheduling). On the other hand, a PDCCH is not transmitted in another DL CC. Accordingly, the UE monitors the PDCCH not including the CIF to receive a self-carrier scheduled PDSCH depending on whether the cross-carrier scheduling is configured for the UE, or monitors the PDCCH including the CIF to receive the cross-carrier scheduled PDSCH.

On the other hand, FIGS. 9 and 10 illustrate the subframe structure of the 3GPP LTE-A system, and the same or similar configuration may be applied to the 3GPP NR system. However, in the 3GPP NR system, the subframes of FIGS. 9 and 10 may be replaced with slots.

<Communication Method in Unlicensed Band>

FIG. 11 illustrates a New Radio-Unlicensed (NR-U) service environment.

Referring to FIG. 11, a service environment in which NR technology 11 in the existing licensed band and NR-Unlicensed (NR-U), i.e., NR technology 12 in the unlicensed band may be provide to the user. For example, in the NR-U environment, NR technology 11 in the licensed band and the NR technology 21 in the unlicensed band may be integrated using technologies such as carrier aggregation which may contribute to network capacity expansion. In addition, in an asymmetric traffic structure with more downlink data than uplink data, NR-U can provide an NR service optimized for various needs or environments. For convenience, the NR technology in the licensed band is referred to as NR-L (NR-Licensed), and the NR technology in the unlicensed band is referred to as NR-U (NR-Unlicensed).

FIG. 12 illustrates a conventional communication scheme (e.g., wireless LAN) operating in an unlicensed band. Since most devices that operate in the unlicensed band operate based on listen-before-talk (LBT), a clear channel assessment (CCA) technique that senses a channel before data transmission is performed.

Referring to FIG. 12, a wireless LAN device (e.g., AP or STA) checks whether the channel is busy by performing carrier sensing before transmitting data. When a predetermined strength or more of radio signal is sensed in a channel to transmit data, it is determined that the corresponding channel is busy and the wireless LAN device delays the access to the corresponding channel. Such a process is referred to as clear channel evaluation and a signal level to decide whether the signal is sensed is referred to as a CCA threshold. Meanwhile, when the radio signal is not sensed in the corresponding channel or a radio signal having a strength smaller than the CCA threshold is sensed, it is determined that the channel is idle.

When it is determined that the channel is idle, a terminal having data to be transmitted performs a backoff procedure after a defer duration (e.g., arbitration interframe space (AIFS), PCF IFS (PIFS), or the like). The defer duration represents a minimum time when the terminal needs to wait after the channel is idle. The backoff procedure allows the terminal to further wait for a predetermined time after the defer duration. For example, the terminal stands by while decreasing a slot time for slot times corresponding to a random number allocated to the terminal in the contention window (CW) during the channel is idle, and a terminal that completely exhausts the slot time may attempt to access the corresponding channel.

When the terminal successfully accesses the channel, the terminal may transmit data through the channel. When the data is successfully transmitted, a CW size (CWS) is reset to an initial value (CWmin). On the contrary, when the data is unsuccessfully transmitted, the CWS increases twice. As a result, the terminal is allocated with a new random number within a range which is twice larger than a previous random number range to perform the backoff procedure in a next CW. In the wireless LAN, only an ACK is defined as receiving response information to the data transmission. Therefore, when the ACK is received with respect to the data transmission, the CWS is reset to the initial value and when feed-back information is not received with respect to the data transmission, the CWS increases twice.

As described above, since the existing communication in the unlicensed band mostly operates based on LBT, a channel access in the NR-U system also performs LBT for coexistence with existing devices. Specifically, the channel access method on the unlicensed band in the NR may be classified into the following four categories according to the presence/absence of LBT/application method.

Category 1: No LBT
  The Tx entity does not perform the LBT procedure for transmission.

Category 2: LBT without Random Backoff
  The Tx entity senses whether a channel is idle during a first interval without random backoff to perform a transmission. That is, the Tx entity may perform a transmission through the channel immediately after the channel is sensed to be idle during the first interval. The first interval is an interval of a predetermined length immediately before the Tx entity performs the transmission. According to an embodiment, the first interval may be an interval of 25 us length, but the present invention is not limited thereto.

Category 3: LBT Performing Random Backoff Using CW of Fixed Size
  The Tx entity obtains a random value within the CW of the fixed size, sets it to an initial value of a backoff counter (or backoff timer) N, and performs backoff by using the set backoff counter N. That is, in the backoff procedure, the Tx entity decreases the backoff counter by 1 whenever the channel is sensed to be idle for a predetermined slot period. Here, the predetermined slot period may be 9 μs, but the present invention is not limited thereto. The backoff counter N is decreased by 1 from the initial value, and when the value of the backoff counter N reaches 0, the Tx entity may perform the transmission. Meanwhile, in order to perform backoff, the Tx entity first senses whether the channel is idle during a second interval (that is, a defer duration Td). According to an embodiment of the present invention, the Tx entity may sense (determine) whether the channel is idle during the second interval, according to whether the channel is idle for at least some period (e.g., one slot period) within the second interval. The second interval may be set based on the channel access priority class of the Tx entity, and consists of a period of 16 us and m consecutive slot periods. Here, m is a value set according to the channel access priority class. The Tx entity performs channel sensing to decrease the backoff counter when the channel is sensed to be idle during the second interval. On the other hand, when the channel is sensed to be busy during the backoff procedure, the backoff procedure is stopped. After stopping the backoff procedure, the Tx entity may resume backoff when the channel is sensed to be idle for an additional second interval. In this way, the Tx entity may perform the transmission when the channel is idle during the slot period of the backoff counter N, in addition to the second interval. In this case, the initial value of the backoff counter N is obtained within the CW of the fixed size.

Category 4: LBT Performing Random Backoff by Using CW of Variable Size

The Tx entity obtains a random value within the CW of a variable size, sets the random value to an initial value of a backoff counter (or backoff timer) N, and performs backoff by using the set backoff counter N. More specifically, the Tx entity may adjust the size of the CW based on HARQ-ACK information for the previous transmission, and the initial value of the backoff counter N is obtained within the CW of the adjusted size. A specific process of performing backoff by the Tx entity is as described in Category 3. The Tx entity may perform the transmission when the channel is idle during the slot period of the backoff counter N, in addition to the second interval. In this case, the initial value of the backoff counter N is obtained within the CW of the variable size.

In the above Category 1 to Category 4, the Tx entity may be a base station or a UE. According to an embodiment of the present invention, a first type channel access may refer to a Category 4 channel access, and a second type channel access may refer to a Category 2 channel access.

FIG. 13 illustrates a channel access procedure based on Category 4 LBT according to an embodiment of the present invention.

In order to perform the channel access, first, the Tx entity performs channel sensing for the defer duration Td (S302). According to an embodiment of the present invention, the channel sensing for a defer duration Td in step S302 may be performed through channel sensing for at least a portion of the defer duration Td. For example, the channel sensing for the defer duration Td may be performed through the channel sensing during one slot period within the defer duration Td. The Tx entity checks whether the channel is idle through the channel sensing for the defer duration Td (S304). If the channel is sensed to be idle for the defer duration Td, the Tx entity proceeds to step S306. If the channel is not sensed to be idle for the defer duration Td (that is, sensed to be busy), the Tx entity returns to step S302. The Tx entity repeats steps S302 to S304 until the channel is sensed to be idle for the defer duration Td. The defer duration Td may be set based on the channel access priority class of the Tx entity, and consists of a period of 16 us and m consecutive slot periods. Here, m is a value set according to the channel access priority class.

Next, the Tx entity obtains a random value within a predetermined CW, sets the random value to the initial value of the backoff counter (or backoff timer) N (S306), and proceeds to step S308. The initial value of the backoff counter N is randomly selected from values between 0 and CW. The Tx entity performs the backoff procedure by using the set backoff counter N. That is, the Tx entity performs the backoff procedure by repeating S308 to S316 until the value of the backoff counter N reaches 0. Meanwhile, FIG. 13 illustrates that step S306 is performed after the channel is sensed to be idle for the defer duration Td, but the present invention is not limited thereto. That is, step S306 may be performed independently of steps S302 to S304, and may be performed prior to steps S302 to S304. When step S306 is performed prior to steps S302 to S304, if the channel is sensed to be idle for the defer duration Td by steps S302 to S304, the Tx entity proceeds to step S308.

In step S308, the Tx entity checks whether the value of the backoff counter N is 0. If the value of the backoff counter N is 0, the Tx entity proceeds to step S320 to perform a transmission. If the value of the backoff counter N is not 0, the Tx entity proceeds to step S310. In step S310, the Tx entity decreases the value of the backoff counter N by 1. According to an embodiment, the Tx entity may selectively decrease the value of the backoff counter by 1 in the channel sensing process for each slot. In this case, step S310 may be skipped at least once by the selection of the Tx entity. Next, the Tx entity performs channel sensing for an additional slot period (S312). The Tx entity checks whether the channel is idle through the channel sensing for the additional slot period (S314). If the channel is sensed to be idle for the additional slot period, the Tx entity returns to step S308. In this way, the Tx entity may decrease the backoff counter by 1 whenever the channel is sensed to be idle for a predetermined slot period. Here, the predetermined slot period may be 9 µs, but the present invention is not limited thereto.

In step S314, if the channel is not sensed to be idle for the additional slot period (that is, sensed to be busy), the Tx entity proceeds to step S316. In step S316, the Tx entity checks whether the channel is idle for the additional defer duration Td. According to an embodiment of the present invention, the channel sensing in step S316 may be performed in units of slots. That is, the Tx entity checks whether the channel is sensed to be idle during all slot periods of the additional defer duration Td. When the busy slot is detected within the additional defer duration Td, the Tx entity immediately restarts step S316. When the channel is sensed to be idle during all slot periods of the additional defer duration Td, the Tx entity returns to step S308.

On the other hand, if the value of the backoff counter N is 0 in the check of step S308, the Tx entity performs the transmission (S320). The Tx entity receives a HARQ-ACK feedback corresponding to the transmission (S322). The Tx entity may check whether the previous transmission is successful through the received HARQ-ACK feedback. Next, the Tx entity adjusts the CW size for the next transmission based on the received HARQ-ACK feedback (S324).

As described above, after the channel is sensed to be idle for the defer duration Td, the Tx entity may perform the transmission when the channel is idle for N additional slot periods. As described above, the Tx entity may be a base station or a UE, and the channel access procedure of FIG. 13 may be used for downlink transmission of the base station and/or uplink transmission of the UE.

FIG. 14 is a block diagram showing the configurations of a UE and a base station according to an embodiment of the present invention. In an embodiment of the present invention, the UE may be implemented with various types of wireless communication devices or computing devices that are guaranteed to be portable and mobile. The UE may be referred to as a User Equipment (UE), a Station (STA), a Mobile Subscriber (MS), or the like. In addition, in an embodiment of the present invention, the base station controls and manages a cell (e.g., a macro cell, a femto cell, a pico cell, etc.) corresponding to a service area, and performs functions of a signal transmission, a channel designation, a channel monitoring, a self diagnosis, a relay, or the like. The base station may be referred to as next Generation NodeB (gNB) or Access Point (AP).

As shown in the drawing, a UE 100 according to an embodiment of the present disclosure may include a processor 110, a communication module 120, a memory 130, a user interface 140, and a display unit 150.

First, the processor 110 may execute various instructions or programs and process data within the UE 100. In addition, the processor 100 may control the entire operation including each unit of the UE 100, and may control the transmission/reception of data between the units. Here, the processor 110 may be configured to perform an operation according to the embodiments described in the present invention. For example, the processor 110 may receive slot configuration information, determine a slot configuration based on the slot configuration information, and perform communication according to the determined slot configuration.

Next, the communication module 120 may be an integrated module that performs wireless communication using a wireless communication network and a wireless LAN access using a wireless LAN. For this, the communication module 120 may include a plurality of network interface cards (NICs) such as cellular communication interface cards 121 and 122 and an unlicensed band communication interface card 123 in an internal or external form. In the drawing, the communication module 120 is shown as an integral integration module, but unlike the drawing, each network interface card can be independently arranged according to a circuit configuration or usage.

The cellular communication interface card 121 may transmit or receive a radio signal with at least one of the base station 200, an external device, and a server by using a mobile communication network and provide a cellular communication service in a first frequency band based on the instructions from the processor 110. According to an embodiment, the cellular communication interface card 121 may include at least one NIC module using a frequency band of less than 6 GHz. At least one NIC module of the cellular communication interface card 121 may independently perform cellular communication with at least one of the base station 200, an external device, and a server in accordance with cellular communication standards or protocols in the frequency bands below 6 GHz supported by the corresponding NIC module.

The cellular communication interface card 122 may transmit or receive a radio signal with at least one of the base station 200, an external device, and a server by using a mobile communication network and provide a cellular communication service in a second frequency band based on the instructions from the processor 110. According to an embodiment, the cellular communication interface card 122 may include at least one NIC module using a frequency band of more than 6 GHz. At least one NIC module of the cellular communication interface card 122 may independently perform cellular communication with at least one of the base station 200, an external device, and a server in accordance with cellular communication standards or protocols in the frequency bands of 6 GHz or more supported by the corresponding NIC module.

The unlicensed band communication interface card 123 transmits or receives a radio signal with at least one of the base station 200, an external device, and a server by using a third frequency band which is an unlicensed band, and provides an unlicensed band communication service based on the instructions from the processor 110. The unlicensed band communication interface card 123 may include at least one NIC module using an unlicensed band. For example, the unlicensed band may be a band of 2.4 GHZ, 5 GHZ, 6 GHZ, 7 GHz or above 52.6 GHz. At least one NIC module of the unlicensed band communication interface card 123 may independently or dependently perform wireless communication with at least one of the base station 200, an external device, and a server according to the unlicensed band communication standard or protocol of the frequency band supported by the corresponding NIC module.

The memory 130 stores a control program used in the UE 100 and various kinds of data therefor. Such a control program may include a prescribed program required for performing wireless communication with at least one among the base station 200, an external device, and a server.

Next, the user interface 140 includes various kinds of input/output means provided in the UE 100. In other words, the user interface 140 may receive a user input using various input means, and the processor 110 may control the UE 100 based on the received user input. In addition, the user interface 140 may perform an output based on instructions from the processor 110 using various kinds of output means.

Next, the display unit 150 outputs various images on a display screen. The display unit 150 may output various display objects such as content executed by the processor 110 or a user interface based on control instructions from the processor 110.

In addition, the base station 200 according to an embodiment of the present invention may include a processor 210, a communication module 220, and a memory 230.

First, the processor 210 may execute various instructions or programs, and process internal data of the base station 200. In addition, the processor 210 may control the entire operations of units in the base station 200, and control data transmission and reception between the units. Here, the processor 210 may be configured to perform operations according to embodiments described in the present invention. For example, the processor 210 may signal slot configuration and perform communication according to the signaled slot configuration.

Next, the communication module 220 may be an integrated module that performs wireless communication using a wireless communication network and a wireless LAN access using a wireless LAN. For this, the communication module 220 may include a plurality of network interface cards such as cellular communication interface cards 221 and 222 and an unlicensed band communication interface card 223 in an internal or external form. In the drawing, the communication module 220 is shown as an integral integration module, but unlike the drawing, each network interface card can be independently arranged according to a circuit configuration or usage.

The cellular communication interface card 221 may transmit or receive a radio signal with at least one of the base station 100, an external device, and a server by using a mobile communication network and provide a cellular communication service in the first frequency band based on the instructions from the processor 210. According to an embodiment, the cellular communication interface card 221 may include at least one NIC module using a frequency band of less than 6 GHz. The at least one NIC module of the cellular communication interface card 221 may independently perform cellular communication with at least one of the base station 100, an external device, and a server in accordance with the cellular communication standards or protocols in the frequency bands less than 6 GHz supported by the corresponding NIC module.

The cellular communication interface card 222 may transmit or receive a radio signal with at least one of the base station 100, an external device, and a server by using a mobile communication network and provide a cellular communication service in the second frequency band based on the instructions from the processor 210. According to an embodiment, the cellular communication interface card 222 may include at least one NIC module using a frequency band of 6 GHz or more. The at least one NIC module of the cellular communication interface card 222 may independently perform cellular communication with at least one of the base station 100, an external device, and a server in accordance with the cellular communication standards or protocols in the frequency bands 6 GHz or more supported by the corresponding NIC module.

The unlicensed band communication interface card 223 transmits or receives a radio signal with at least one of the base station 100, an external device, and a server by using the third frequency band which is an unlicensed band, and provides an unlicensed band communication service based on the instructions from the processor 210. The unlicensed band communication interface card 223 may include at least one NIC module using an unlicensed band. For example, the unlicensed band may be a band of 2.4 GHZ, 5 GHZ, 6 GHZ, 7 GHZ or above 52.6 GHz. At least one NIC module of the unlicensed band communication interface card 223 may independently or dependently perform wireless communication with at least one of the base station 100, an external device, and a server according to the unlicensed band communication standards or protocols of the frequency band supported by the corresponding NIC module.

FIG. 14 is a block diagram illustrating the UE 100 and the base station 200 according to an embodiment of the present invention, and blocks separately shown are logically divided elements of a device. Accordingly, the aforementioned elements of the device may be mounted in a single chip or a plurality of chips according to the design of the device. In addition, a part of the configuration of the UE 100, for example, a user interface 140, a display unit 150 and the like may be selectively provided in the UE 100. In addition, the user interface 140, the display unit 150 and the like may be additionally provided in the base station 200, if necessary.

FIG. 15 illustrates a channel access procedure performed by a wireless communication device in an unlicensed band, and an LBT procedure used when a wireless communication device performs a channel access in an unlicensed band. In particular, a channel access in which the wireless communication device performs a transmission according to a result of channel sensing within a time interval of a predetermined duration may be configured in the wireless communication device. In this case, a method for operating a wireless communication device when the wireless communication device fails to access a channel will be described. The specified duration which has been mentioned earlier may be 16 µs.

For convenience of description, the wireless communication device, which is a wireless endpoint that initiates channel occupation, is referred to as an initiating node. In addition, a wireless communication device, which is a wireless endpoint communicating with the initiating node, is referred to as a responding node. The initiating node may be a base station and the responding node may be a UE. In addition, the initiating node may be a UE and the responding node may be a base station. When the initiating node intends to transmit data, the initiating node may perform a channel access according to a channel access priority class determined according to the type of data. In this case, a parameter used for a channel access may be determined according to the type of data. The parameters used for the channel access may include any one of the minimum value of the CW, the maximum value of the CW, the maximum occupancy time (MCOT), which is the maximum duration capable of occupying a channel in one channel occupancy, and the number (mp) of sensing slots. Specifically, the initiating node may perform the above-described Category 4 LBT according to the channel access priority class determined according to the type of data.

Table 4 below shows an example of values of parameters used for a channel access according to the channel access priority class. Specifically, Table 4 shows values of parameters used for a channel access for each channel access priority class for the downlink transmission in the LTE LAA system.

When the downlink channel transmitted by the wireless communication device includes data traffic, the defer duration may be configured according to the channel access priority class of traffic included in the downlink channel. In addition, the defer duration may include an initial duration Tf or one or more (mp) slot durations Ts1. In this case, the slot duration Ts1 may be 9 µs. The initial duration includes one idle slot duration Ts1. In addition, the number (mp) of slot durations included in the defer duration may be configured according to the above-described channel access priority class. Specifically, the number (mp) of slot durations included in the defer duration may be configured as shown in Table 4.

TABLE 4

| Channel Access Priority Class (p) | $m_p$ | $CW_{min,p}$ | $CW_{max,p}$ | $T_{mcot,p}$ | allowed $CH_p$ sizes |
|---|---|---|---|---|---|
| 1 | 1 | 3 | 7 | 2 ms | {3, 7} |
| 2 | 1 | 7 | 15 | 3 ms | {7, 15} |
| 3 | 3 | 15 | 63 | 8 or 10 ms | {15, 31, 63} |
| 4 | 7 | 15 | 1023 | 8 or 10 ms | {15, 31, 63, 127, 255, 511, 1023} |

In addition, the wireless communication device may configure the range of the CW values according to the channel access priority class. Specifically, the wireless communication device may set the value of the CW to satisfy CWmin,p<=CW<=CWmax,p. In this case, the minimum value CWmin,p and the maximum value CWmax,p of the CW may be determined according to the channel access priority class. Specifically, the minimum value CWmin,p and the maximum value CWmax,p of the CW may be determined as shown in Table 4. The wireless communication device may set a minimum value CWmin,p and a maximum value CWmax,p of CW in a counter value setting procedure. When the wireless communication device accesses the channel, the wireless communication device may adjust the value of the CW as described above with reference to FIG. 13. In addition, in the wireless communication device of the unlicensed band, the MCOT Tmcot,p may be determined according to the channel access priority of data included in the transmission as described above. Specifically, the MCOT may be determined as shown in Table 4. Accordingly, the wireless communication device may not be allowed to perform continuous transmissions for a time exceeding the MCOT in the unlicensed band. This is because the unlicensed band is a frequency band used by various wireless communication devices according to certain rules. In Table 4, when the value of the channel access priority class is p=3 or p=4, the unlicensed band is used for a long term according to the regulations, and there is no wireless communication device using other technology, the wireless communication device may be configured with Tmcot,p=10 ms. Otherwise, the wireless communication device may be configured with Tmcot,p=8 ms.

Table 5 shows values of parameters used for a channel access for each channel access priority class for uplink transmission used in the LTE LAA system.

TABLE 5

| LBT priority class | n | CWmin | CWmax | MCOT | Set of CW sizes |
|---|---|---|---|---|---|
| 1 | 2 | 3 | 7 | 2 ms | {3, 7} |
| 2 | 2 | 7 | 15 | 4 ms | {7, 15} |
| 3 | 3 | 15 | 1023 | 6 ms (see note 1) or 10 ms (see note 2) | {15, 31, 63, 127, 255, 511, 1023} |
| 4 | 7 | 15 | 1023 | 6 ms (see note 1) or 10 ms (see note 2) | {15, 31, 63, 127, 255, 511, 1023} |

NOTE 1:
The MCOT of 6 ms may be increased to 8 ms by inserting one or more gaps. The minimum duration of a pause shall be 100 μs. The maximum duration (Channel Occupancy) before including any such gap shall be 6 ms. The gap duration is not included in the channel occupancy time.
NOTE 2:
If the absence of any other technology sharing the carrier can be guaranteed on a long term basis (e.g. by level of regulation), the maximum channel occupancy time ( MCOT) for LBT priority classes 3 and 4 is for 10 ms, otherwise, the MCOT for LBT priority classes 3 and 4 is 6 ms as in note 1.

As described in Table 5, the MCOT value 6 ms may be increased to 8 ms when one or more gaps are included in the transmission. The gap represents the time from when the transmission is stopped in a carrier until the transmission is resumed in the carrier. In this case, the minimum value of the duration of the gap is 100 μs. Furthermore, the maximum value of the duration of transmission performed before the gap is included is 6 ms. Furthermore, the duration of the gap is not included in the channel occupancy time. When the value of the channel access priority class is 3 or 4 and it is guaranteed that no other radio access technology is used in the carrier on which the channel access is performed, the value of MCOT may be 10 ms. In this case, another wireless access technology may include Wi-Fi. Otherwise, the value of the MCOT may be determined as described in Note 1 of Table 5.

The COT represents the time the wireless communication device occupies a channel. As described above, the MCOT represents a time during which the initiating node is able to continuously occupy a channel in any one carrier of a unlicensed band to the maximum. However, as described above, the gap, which is an interval in which the transmission is not performed, may be included between a plurality of transmissions, and when the gap is included, the value of the MCOT may be applied differently.

<Sensing Structure in Deferral Period>

The present disclosure proposes a structure of a basic sensing slot for performing LBT in bands of 52.6 GHz or higher. Furthermore, the present disclosure proposes a sensing structure of a slot for performing LBT in a manner to perform energy measurement in a deferral period of a specific length that may be commonly used in the bands of 52.6 GHz or higher. First, basically, it is assumed that in bands above 52.6 GHz, base stations or UEs, i.e., wireless devices, perform sensing within a 5 us observation slot. In this case, a period within the 5 us observation slot, during which the wireless devices perform sensing, is not precisely defined, but may be defined as at least specific T [us] anywhere within the 5 us observation slot. When the wireless devices perform sensing for T [us] within the 5 us observation slot and detected power is equal to or less than an energy detection threshold (EDT), a channel may be determined to be idle in the observation slot. Here, the energy detection threshold may be calculated using Equation 1 or Equation 2 below.

$$EDT = -80\ dBm + 10*\log 10(Pmax/Pout) + 10*\log 10(\text{operating Channel } BW \text{ in MHz}) \quad \text{<Equation 1>}$$

Here, Pout is RF output power (effective isotropic radiated power (EIRP)) and Pmax is an RF out power limit. Pout may be configured to always be less than or equal to Pmax. In addition, the operating channel BW [MHz] indicates a channel BW at which the wireless devices perform sensing. The operating channel BW may be configured as one of transmission BW, a basic LBT band in which LBT can be performed, or channel BW. The operating channel BW (e.g., the LBT band) includes a set of multiple consecutive frequency resources (e.g., PRBs).

$$EDT = -80\ dBm + Pmax - Pout + 10*\log 10(BW) \quad \text{<Equation 2>}$$

Here, Pout is the maximum EIRP of transmission(s) intended by a wireless device requiring one channel occupancy (CO), and is expressed in dBm. Pmax is an RF out power limit in dBm. Pout may be configured to always be less than or equal to Pmax. The maximum EIRP used during the CO for transmission by the wireless device that initiated the transmission is limited to Pout. Furthermore, BW [MHz] indicates a channel BW on which the wireless device performs sensing. The channel BW may be configured as one of a transmission BW, a basic LBT or a channel BW band in which LBT can be performed, etc. The channel BW (e.g., the LBT band) includes a set of multiple consecutive frequency resources (e.g., PRBs).

Furthermore, the length of the deferral period that is commonly used when the wireless devices perform sensing may be defined as 8 us. However, it may be necessary to define a method of configuring a sensing slot in 8 us, and a period during which the wireless devices perform sensing. Furthermore, it is necessary to define how many times sensing, i.e., energy measurement, should be performed within the 8 us dipper period. The present disclosure proposes a sensing structure for such energy measurement.

Firstly, when energy measurement is to be performed only once within the 8 us deferral period, the sensing structure may be considered as follows.

In a first method, to avoid missing whether the channel is not idle within 8 us, i.e., whether a channel is busy, one observation slot, i.e., 5 us, may be established within the last 5 us of 8 us in the 8 us deferral period. In this case, when the channel is sensed to be idle for the entire period of at least 5 us based on energy measurement occurring in a period shorter than at least actual 5 us, for example, 3 us (or 4 us), in the observation slot, the channel may be determined/configured to be idle within that 8 us deferral period.

In a second method, to avoid missing whether a channel is not idle within 8 us, i.e., whether a channel is busy, one observation slot, i.e., 5 us, may be established within the last 5 us of 8 us in the 8 us deferral period. In this case, when the channel is sensed to be idle for the entire period of at least 5 us based on energy measurement occurring in a period shorter than at least actual 5 us, for example, 3 us (or, 4 us), in the deferral period, the channel may be determined/configured to be idle within the 8 us deferral period.

In a third method, to ensure an Rx-to-Tx switching period when the channel is idle after sensing and transmission is actually performed, the last at least Y [us] of the deferral period may be preconfigured as the Rx-to-Tx switching period, and an observation slot may be configured in the last 5 [us] of the remaining (8−Y) [us] period. In this case, when the channel is sensed to be idle by performing channel sensing once within the 5 us observation slot, the channel may be determined/configured to be idle within the 8 us deferral period.

In a fourth method, to ensure an Rx-to-Tx switching period when the channel is idle after sensing and transmission is actually performed, the last at least Y [us] of the deferral period may be preconfigured as the Rx-to-Tx switching period and an observation slot may be configured in the last 5 [us] of the remaining (8−Y) [us] period. In this case, when the channel is sensed to be idle for the entire period of at least 5 us based on energy measurement occurring in a period shorter than at least actual 5 us, for example, 3 us (or, 4 us), in the observation slot, the channel may be determined/configured to be idle within the 8 us deferral period.

In a fifth method, to ensure an Rx-to-Tx switching period when the channel is idle after sensing and transmission is actually performed, the last at least Y [us] of the deferral period may be preconfigured as the Rx-to-Tx switching period. In this case, when the channel is sensed to be idle for the entire period of at least 5 us based on energy measurement occurring for a period shorter than at least actual 5 us, for example, 3 us (or, 4 us), within the remaining (8−Y) [us] period, the channel may be determined/configured to be idle within the 8 us deferral period.

Secondly, when energy measurement is to be performed twice within an 8 us deferral period, the sensing structure may be considered as follows.

In a first method, to avoid missing whether a channel is not idle within 8 us, i.e., whether the channel is busy, the 8 us deferral period may be configured as a preceding 3 us period and a following 5 us period. That is, the last 5 us of the 8 us deferral period may be configured as one observation slot. In this case, energy measurement may be performed once within the preceding 3 us period and energy measurement may be performed once more within the last 5 us observation slot. When the channel is sensed to be idle in all of the results of performing energy measurement twice, the channel may be determined/configured to be idle within that 8 us deferral period.

In a second method, to avoid missing whether the channel is not idle within 8 us, i.e., whether the channel is busy, the 8 us deferral period may be configured as a preceding 3 us period and a following 5 us period. That is, the last 5 us of the 8 us deferral period may be configured as one observation slot. Energy measurement may be performed once within the preceding 3 us period, and energy measurement may be performed once more in the last 3 us period within the last 5 us observation slot. When the channel is sensed to be idle in all of the result of performing energy measurement twice, the channel may be determined/configured to be idle within the 8 us deferral period.

In a third method, in order to ensure an Rx-to-Tx switching period when the channel is idle after sensing and transmission is actually performed, the last at least Y [us] of the deferral period may be preconfigured as the Rx-to-Tx switching period, and within the remaining (8−Y) [us] period, a preceding 3 us period and a following (8−Y−3) [us] period may be configured. In this case, energy measurement may be performed once within the preceding 3 us period, and energy measurement may be performed once more within the last (8−Y−3) [us] period. When the channel is sensed to be idle in the energy measurement performed twice, the channel may be determined/configured to be idle within the 8 us deferral period. However, when the (8−Y−3) [us] period is configured to be equal to or longer than at least the minimum configured period Z [us] for energy measurement, energy measurement may be configured to be performed once more within the last (8−Y−3) [us] period. When the (8−Y−3) [us] period is shorter than Z [us], the channel may be determined/configured to be idle within the 8 us deferral period, based on only the energy measurement performed within the preceding 3 us period.

Type 1/2/3 channel access procedures (CAPs) presented in the present disclosure may be defined as follows. In the description of the present disclosure, performing a Type X channel access procedure may be described as performing Type X channel access.

Type 1 Channel Access Procedure (CAP)
  This is a channel access method that has a fixed contention window (CW) and performs random back-off without CW adjustment.

Type 2 Channel Access Procedure (CAP)
  This is a channel access method that performs sensing without back-off during a time period of a single interval. This is a method where the time interval during which sensing must be performed before performing UL or DL transmission is deterministically configured. In the time period of a single interval, at least one sensing slot(s), which must be sensed as idle before transmission, is spanned.
  In one example, a single interval T_d may include a sensing slot for performing single measurement at least once to determine whether a channel has been sensed to be idle, and when the channel is sensed to be idle, transmission may be performed in the channel immediately after T_d.

Type 3 Channel Access Procedure (CAP)
  This is a channel access method that performs transmission in a corresponding channel without channel sensing.

<Multiple Beam-Based Channel Sensing/Transmission>

The present disclosure relates to a sensing method performed before the start of channel occupancy (CO) and a transmission method after CO configuration/set-up (e.g., within the CO) when a node (e.g., a base station or UE) intends to sense a channel based on a multiple-beam operation, configure a channel occupancy time (COT) (or channel occupancy (CO)) based on the sensing result, and perform transmission.

FIGS. 16 and 17 illustrate multiple beams in which channel sensing/transmission is performed. Referring to FIGS. 16 and 17, BW in the frequency domain may include multiple channel BWs (e.g., LBT BWs), and channel sensing/transmission may be performed for each channel BW. A channel BW may include multiple consecutive PRBs (i.e., a PRB set) in the frequency domain. In the spatial domain, one channel BW may be divided into multiple beams. The multiple beams within a channel BW may share time-frequency resources, and channel sensing/transmission may be performed on a beam basis.

FIG. 18 illustrates a beam-based channel sensing/transmission method. Referring to FIG. 18, channel sensing/transmission may each be performed on a beam basis. In the drawing, s, f, and t represent a spatial axis, a frequency axis, and a time axis, respectively. Meanwhile, a beam in which channel sensing is performed (hereinafter, "sensing beam") and a beam in which channel transmission is performed (hereinafter, "transmission beam") may be independently configured. The linkage/correspondence relationship between the sensing beam and the transmission beam may be defined as 1-to-1 or 1-to-many. For example, one sensing beam may cover all transmission beams (Case A), or one sensing beam may cover one or more transmission beams (Case B). Accordingly, a channel access procedure for a transmission beam includes performing the channel access procedure for a sensing beam corresponding to the transmission beam. For example, when channel transmission (on a transmission beam) is required, channel sensing may be performed on a sensing beam before CO (or COT), and when the CO is configured based on the channel sensing result, the channel transmission may be performed on (or using) a corresponding transmission beam within the CO. The CO may be started at the same time point for multiple transmission beams.

When one CO includes transmissions that are spatial-domain multiplexed (SDM) between different beams, the following methods may be used for sensing before the start of the CO and for transmission after CO configuration/set-up (e.g., within the CO). FIG. 19 illustrates channel sensing/transmission operations when the transmissions included in the CO are spatial domain multiplexed among multiple beams.

1. When a Single Sensing Beam Covers all Transmission Beams within One CO (Case a in FIG. 18)
   A. When a single sensing beam covers all transmission beams in the CO, a Type 1 channel access (procedure) may be performed before the start of the CO by using the single sensing beam. Then, after successful channel access using the single sensing beam, transmission may be started in the CO by using a specific transmission beam (Tx beam #0/1 in FIG. 19). In this case, the Type 3 channel access (procedure) may be performed with respect to transmissions using different transmission beams within the same CO to perform the transmission(s) intended to be performed using the corresponding transmission beam(s) (Tx beam #2 in FIG. 19). That is, the transmission(s) included in the CO by spatial domain multiplexing may be transmitted without sensing (for a corresponding sensing beam) between transmission beam(s). On the other hand, when the Type 1 channel access fails before the start of the CO, the transmission(s) intended to be transmitted using the corresponding transmission beam may be dropped.

2. When Each Sensing Beam Covers at Least One Transmission Beam within One CO (Case B in FIG. 18)
   A. When Type 1 channel access is performed using multiple sensing beams before the simultaneous start of the CO (i.e., the CO starts at the same time between transmission beams),
      i. By setting an independent Ninit value for each sensing beam (see FIG. 13), a back-off-based Type 1 channel access (procedure) may be performed for each sensing beam. This is for the purpose of ensuring that, as the channel state may differ for each sensing beam, when channel access for at least one sensing beam is successful, transmission(s) may be performed with a transmission beam corresponding to the sensing beam. In this case, there may be an advantage of reducing latency caused by LBT failure for intended transmission at one node (e.g., a base station or UE). Furthermore, even when any one of the sensing beams fails in channel access, if at least one of the sensing beams succeeds in channel access, the intended transmission(s) may be performed based on transmission beam(s) corresponding to the successful sensing beam(s). However, transmission(s) intended to be transmitted using a transmission beam corresponding to a sensing beam, among the sensing beams, which has failed in channel access, may be dropped.
      ii. The Type 1 channel access (procedure) may be performed for each sensing beam by performing back-off for each sensing beam, extracting/selecting an Ninit value for each sensing beam, and setting the largest value among the respective independent Ninit values of the sensing beam as a common Ninit value. This is a method that sets the length of back-off that can be performed on each sensing beam to the maximum, although the channel state may differ for each sensing beam. This is for the purpose of ensuring that back-off is performed for each sensing beam within the maximum length limit of the back-off, so that when channel access for at least one sensing beam is successful within the maximum length limit, transmission(s) may be performed with a transmission beam corresponding to the sensing beam. This may have the advantage of reducing latency due to LBT failure for intended transmission at one node (e.g., a base station or UE). Further, even when any one of the sensing beams fails in channel access, if at least one of the sensing beams succeeds in channel access, intended transmission(s) may be performed with transmission beam(s) corresponding to the successful sensing beam(s). However, transmission(s) intended to be transmitted using a transmission beam corresponding to a sensing beam, among the sensing beams, which has failed in channel access, may be dropped.

When one CO includes transmission(s) that are time domain multiplexed (TDM) between different beams, the following methods may be used for sensing performed before the start of the CO and transmission performed after CO configuration/set-up (e.g., within the CO). FIGS. 20 to 22 illustrate channel sensing/transmission operations when transmission(s) included in CO are time domain multiplexed between multiple beams.

Referring to FIG. 20, a node (e.g., a base station or UE) may perform a channel access (procedure) (e.g., a Type 1 channel access procedure) for one or more sensing beams before the start of CO. When the channel access is successful, the node may perform transmission on a first transmission beam within the CO (e.g., Tx beam #0 in FIG. 20). On the other hand, when transmission is intended to be performed on a second transmission beam within the CO (e.g., Tx beam #2 in FIG. 20) by time-domain multiplexing, the node may perform a channel access (procedure) for a sensing beam corresponding to the second transmission beam in order to perform the transmission on the second transmission beam. Here, the channel access procedure may include a Type 2 or Type 3 channel access (procedure). When the transmission using the first transmission beam and the transmission using the second transmission beam are multiplexed in the time domain, the transmission on the first transmission beam and the transmission on the second transmission beam do not overlap each other in the time domain. The CO may be started at the same time point for multiple transmission beams.

1. When a Single Sensing Beam Covers all Transmission Beams within One CO
   A. When a single sensing beam covers all transmission beams, Type 1 channel access may be performed before the start of the CO by using the single sensing beam. Then, after successful channel access using the single sensing beam, transmission may be started in the CO by using a specific transmission beam (e.g., Tx beam #0 in FIG. 20). In this case, for transmissions using different transmission beams (e.g., Tx beam #1/2 in FIG. 20), Type 3 channel access (for the sensing beam) may be performed within the same CO to perform transmission (s) intended to be transmitted using a corresponding transmission beam (e.g., Tx beam #2 FIG. 20). However, when the Type 1 channel access (using the sensing beam) fails before the start of the CO, transmission(s) intended to be transmitted using a corresponding transmission beam may be dropped.
2. Each Sensing Beam Covers at Least One Transmission Beam within One CO
   A. When Type 1 channel access is performed using multiple sensing beams before the simultaneous start of the CO (i.e., the CO starts at the same time between transmission beams),
      i. By setting an independent Ninit value for each sensing beam (see FIG. 13), a back-off-based Type 1 channel access (procedure) may be performed for each sensing beam. This is for the purpose of ensuring that, as the channel state may differ for each sensing beam, when channel access for at least one sensing beam is successful, transmission(s) may be performed with a transmission beam corresponding to the sensing beam. This may have an advantage of reducing latency caused by LBT failure for intended transmission at one node (e.g., a base station or UE). Furthermore, even when any one of the sensing beams fails in channel access, if at least one of the sensing beams succeeds in channel access, intended transmission(s) may be performed based on transmission beam(s) corresponding to the successful sensing beam(s). However, transmission(s) intended to be transmitted using a transmission beam corresponding to a sensing beam, among the sensing beams, which has failed in channel access, may be dropped.

Furthermore, when channel access is (all) successful for first sensing beam(s), a transmission intended to be transmitted may be performed first (on transmission beam(s) corresponding to the sensing beam(s) on which channel access is successful), depending on TDM (e.g., Tx beam #0 in FIGS. 21 and 22). On the other hand, for subsequent transmissions within the CO, i.e., for transmissions using different transmission beams (Tx beam #1 in FIG. 21,) (corresponding to sensing beam(s) on which channel access is successful), Type 3 channel access may be performed within the same CO (for the sensing beam(s)) to perform transmission(s) intended to be transmitted, by using a corresponding transmission beam.

Furthermore, channel access corresponding to the first sensing beam(s) (among the sensing beams) has (all) succeeded, beam switching may be performed to a transmission beam (e.g., Tx beam #2 in FIG. 22) that does not correspond to a pre-sensed beam (an already sensed beam; the first sensing beam(s)) (e.g., Tx beam #0=>#2 in FIG. 22). In this case, Type 2 channel access may be performed (for the sensing beam corresponding to the transmission beam) within the CO (e.g., Tx beam #2 in FIG. 22). If the Type 2 channel access within the CO is successful, the node (e.g., a base station or UE) may perform transmission by performing beam switching to a transmission beam intended to be transmitted. On the other hand, when the Type 2 channel access fails (for the sensing beam corresponding to the transmission beam) within the CO, the node (e.g., the base station or UE) may perform transmission by performing Type 1 channel access (within the CO) for a sensing beam corresponding to a transmission beam (e.g., Tx beam #2 in FIG. 22) that is not included in a pre-sensed beam (e.g., the first sensing beam(s)). However, when the Type 1 channel access fails, transmission(s) intended to be transmitted using a corresponding transmission beam may be dropped.

ii. The Type 1 channel access may be performed for each sensing beam by performing back-off for each sensing beam, extracting/selecting an Ninit value for each sensing beam, and setting the largest value among the respective independent Ninit values of the sensing beams as a common Ninit value. This is a method that sets the length of back-off, which can be performed on each sensing beam, to the maximum, although the channel state may differ for each sensing beam. This is for the purpose of ensuring that back-off is performed for each sensing beam within the maximum length limit of the back-off, so that when channel access for at least one sensing beam is successful within the maximum length limit of the back-off, transmission(s) may be performed with a transmission beam corresponding to the sensing beam. Furthermore, this may have the advantage of reducing latency due to LBT failure for intended transmission at one node (e.g., a base station or UE). Furthermore, even when any one of the sensing beams fails in channel access, if at least one of the sensing beams succeeds in channel access, intended transmission(s) may be performed using transmission beam(s) corresponding to the successful sensing beam(s). However, for transmission(s) intended to be transmitted using a transmission beam corresponding to a sensing beam, among the sensing beams, which has failed in channel access, the transmission(s) may be dropped.

Furthermore, when channel access is (all) successful for first sensing beam(s), a transmission intended to be transmitted may be performed first (on transmission beam(s) corresponding to the sensing beam(s) on which channel access is successful), depending on TDM (e.g., Tx beam #0 in FIGS. 21 and 22). On the other hand, for subsequent transmissions within the CO, i.e., for transmissions using different transmission beams (Tx beam #1 in FIG. 21,) (corresponding to sensing beam(s) on which channel access is successful), Type 3 channel access may be performed within the same CO (for the sensing beam(s)) to perform transmission(s) intended to be transmitted by using a corresponding transmission beam.

Furthermore, channel access corresponding to the first sensing beam(s) (among the sensing beams) has (all) succeeded, beam switching may be performed to a transmission beam (e.g., Tx beam #2 in FIG. 22) that does not correspond to a pre-sensed beam (an already sensed beam; the first sensing beam(s)) (e.g., Tx beam #0=>#2 in FIG. 22). In this case, Type 2 channel access may be performed (for the sensing beam corresponding to the transmission beam) within the CO (e.g., Tx beam #2 in FIG. 22). If the Type 2 channel access within the CO is successful, the node (e.g., a base station or UE) may perform transmission by performing beam switching to a transmission beam intended to be transmitted. On the other hand, when the Type 2 channel access fails (for the sensing beam corresponding to the transmission beam) within the CO, the node (e.g., the base station or UE) may perform transmission by performing Type 1 channel access (within the CO) for a sensing beam corresponding to a transmission beam (e.g., Tx beam #2 in FIG. 22) that is not included in a pre-sensed beam (e.g., the first sensing beam(s)). However, when the Type 1 channel access fails, transmission(s) intended to be transmitted using a corresponding transmission beam may be dropped.

Although the method and system of the present invention have been described in connection with specific embodiments, some or all of components or operations thereof may be implemented using a computing system having a general-purpose hardware architecture.

The description of the present invention described above is only exemplary, and it will be understood by those skilled in the art to which the present invention pertains that various modifications and changes can be made without changing the technical spirit or essential features of the present invention. Therefore, it should be construed that the embodiments described above are illustrative and not restrictive in all respects. For example, each component described as a single type may be implemented in a distributed manner, and similarly, components described as being distributed may also be implemented in a combined form.

The scope of the present invention is indicated by the attached claims rather than the detailed description, and it should be construed that all changes or modifications derived from the meaning and scope of the claims and their equivalents are included in the scope of the present invention.

The invention claimed is:

1. A wireless device configured to operate in a wireless communication system, the wireless device comprising:
   a communication module; and
   a processor configured to control the communication module,
   wherein the processor is configured to:
   perform simultaneous sensing for a plurality of transmission (Tx) beams by applying a first channel access per sensing beam before a start of a channel occupancy (CO), the sensing beam covering at least one Tx beam among the plurality of Tx beams;
   when the first channel access is successful for the plurality of Tx beams, perform a transmission in a first Tx beam among the plurality of Tx beams within the CO; and
   perform a second channel access within the CO, before a beam switching from the first Tx beam to a second Tx beam for transmissions multiplexed in a time domain within the CO,
   wherein a type of the second channel access is determined based on whether the second Tx beam is included in the plurality of Tx beams, as follows:
   Type 2 channel access when the second Tx beam is not included in the plurality of Tx beams, and
   Type 3 channel access when the second Tx beam is included in the plurality of Tx beams.

2. The wireless device of claim 1, wherein the CO is started identically for the plurality of Tx beams.

3. The wireless device of claim 1, wherein the first channel access procedure is independently performed based on a random back-off for each sensing beam.

4. The wireless device of claim 3, wherein an initial value of a random back-off counter in the first channel access procedure is independently configured determined for each sensing beam.

5. The wireless device of claim 1, wherein the wireless communication system comprises a 3rd Generation Partnership Project (3GPP)-based wireless communication system.

6. A method for use by a wireless device in a wireless communication system, the method comprising:
   performing simultaneous sensing for a plurality of transmission (Tx) beams by applying a first channel access per sensing beam before a start of a channel occupancy (CO), the sensing beam covering at least one Tx beam among the plurality of Tx beams;
   when the first channel access is successful for the plurality of Tx beams, performing a transmission in a first Tx beam among the plurality of Tx beams within the CO; and
   performing a second channel access within the CO, before a beam switching from the first Tx beam to a second Tx beam for transmissions multiplexed in a time domain within the CO,
   wherein a type of the second channel access is determined based on whether the second Tx beam is included in the plurality of Tx beams, as follows:
   Type 2 channel access when the second Tx beam is not included in the plurality of Tx beams, and
   Type 3 channel access when the second Tx beam is included in the plurality of Tx beams.

7. The method of claim 6, wherein the CO is started identically for the plurality of Tx beams.

8. The method of claim 6, wherein the first channel access is independently performed based on a random back-off for each sensing beam.

9. The method of claim 8, wherein an initial value of a random back-off counter in the first channel access independently determined for each sensing beam.

10. The method of claim 6, wherein the wireless communication system comprises a 3rd Generation Partnership Project (3GPP)-based wireless communication system.

11. The wireless device of claim 1, wherein the Type 2 channel access is performed based on sensing a channel only within a fixed-duration, and the Type 3 channel access is performed without sensing a channel.

12. The method of claim 6, wherein the Type 2 channel access is performed based on sensing a channel only within a fixed-duration, and the Type 3 channel access is performed without sensing a channel.

\* \* \* \* \*